United States Patent
Mishaeli et al.

(10) Patent No.: US 12,020,031 B2
(45) Date of Patent: *Jun. 25, 2024

(54) METHODS, APPARATUS, AND INSTRUCTIONS FOR USER-LEVEL THREAD SUSPENSION

(71) Applicant: Intel Corporation, Santa Clara, CA (US)

(72) Inventors: Michael Mishaeli, Zichron Yaakov (IL); Jason W. Brandt, Austin, TX (US); Gilbert Neiger, Portland, OR (US); Asit K. Mallick, Saratoga, CA (US); Rajesh M. Sankaran, Portland, OR (US); Raghunandan Makaram, Northborough, MA (US); Benjamin C. Chaffin, Portland, OR (US); James B. Crossland, Banks, OR (US); H. Peter Anvin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,901

(22) Filed: May 31, 2021

(65) Prior Publication Data

US 2021/0357214 A1 Nov. 18, 2021

Related U.S. Application Data

(63) Continuation of application No. 15/019,112, filed on Feb. 9, 2016, now Pat. No. 11,023,233.

(51) Int. Cl.
*G06F 9/30* (2018.01)
*G06F 9/38* (2018.01)
(Continued)

(52) U.S. Cl.
CPC .......... *G06F 9/3009* (2013.01); *G06F 9/3004* (2013.01); *G06F 9/30076* (2013.01);
(Continued)

(58) Field of Classification Search
None
See application file for complete search history.

(56) References Cited

U.S. PATENT DOCUMENTS 5,392,444 A * 2/1995 Inoue ..................... G05B 19/05
712/42
6,671,795 B1 12/2003 Marr et al.
(Continued)

FOREIGN PATENT DOCUMENTS

CN 1608246 A 4/2005
CN 101038543 A 9/2007
(Continued)

OTHER PUBLICATIONS

"Advanced Configuration and Power Interface Specification", Version 6.0, Apr. 2015 (Year: 2015).
(Continued)

*Primary Examiner* — John M Lindlof
(74) *Attorney, Agent, or Firm* — Nicholson De Vos Webster & Elliott LLP

(57) ABSTRACT

A processor of an aspect includes a decode unit to decode a user-level suspend thread instruction that is to indicate a first alternate state. The processor also includes an execution unit coupled with the decode unit. The execution unit is to perform the instruction at a user privilege level. The execution unit in response to the instruction, is to: (a) suspend execution of a user-level thread, from which the instruction is to have been received; (b) transition a logical processor, on which the user-level thread was to have been running, to the indicated first alternate state; and (c) resume the execu-
(Continued)

tion of the user-level thread, when the logical processor is in the indicated first alternate state, with a latency that is to be less than half a latency that execution of a thread can be resumed when the logical processor is in a halt processor power state.

18 Claims, 16 Drawing Sheets

(51) Int. Cl.
  *G06F 9/48* (2006.01)
  *G06F 13/40* (2006.01)
(52) U.S. Cl.
  CPC .......... *G06F 9/3851* (2013.01); *G06F 9/485* (2013.01); *G06F 13/4068* (2013.01)

(56) References Cited

U.S. PATENT DOCUMENTS

| | | | |
|---|---|---|---|
| 7,213,093 B2 | 5/2007 | Hammarlund et al. | |
| 7,363,474 B2 | 4/2008 | Rodgers et al. | |
| 8,464,035 B2 | 6/2013 | Dixon et al. | |
| 9,081,687 B2 | 7/2015 | Offen et al. | |
| 2003/0126416 A1 | 7/2003 | Marr et al. | |
| 2004/0255296 A1* | 12/2004 | Schmidt | G06F 9/4887 718/100 |
| 2006/0294406 A1* | 12/2006 | Cline | G06F 1/3215 713/320 |
| 2009/0307707 A1 | 12/2009 | Gellerich et al. | |
| 2010/0332753 A1* | 12/2010 | Gray | G06F 1/3225 713/323 |
| 2012/0054511 A1* | 3/2012 | Brinks | G06F 1/3243 713/310 |
| 2013/0067490 A1 | 3/2013 | Singh et al. | |
| 2014/0075163 A1 | 3/2014 | Loewenstein et al. | |
| 2014/0109096 A1 | 4/2014 | Chandhoke | |
| 2014/0129784 A1 | 5/2014 | Chapman et al. | |
| 2015/0095580 A1 | 4/2015 | Liu et al. | |
| 2017/0185458 A1 | 6/2017 | Chaffin et al. | |

FOREIGN PATENT DOCUMENTS

| | | |
|---|---|---|
| CN | 101944046 A | 1/2011 |
| TW | I390445 B | 3/2013 |
| TW | I512619 B | 12/2015 |
| WO | 2017/139054 A1 | 8/2017 |

OTHER PUBLICATIONS

Allowance Decision of Examination, TW App. No. 106101044, dated Jul. 12, 2021, 3 pages (1 page of English Translation and 2 pages of Original Document).
AMD, AMD64 Architecture Programmer's Manual vol. 3: General-Purpose and System Instructions, Jun. 1, 2015, Publication No. 24594, Revision 3.22, pp. 1-27.
Final Office Action, U.S. Appl. No. 15/019,112, dated Apr. 20, 2020, 12 pages.
First Office Action, TW App. No. 106101044, dated Oct. 7, 2020, 15 pages (9 pages of English Translation and 6 pages of Original Document).
Intel, "Intel 64 and IA-32 Architectures Sollware Developer's Manual", Combined vols. 1, 2A, 28, 2C, 3A, 38 nd 3C, Jun. 2014, pp. vol. 1 5-21, vol. 112-5, vol. 2A 3-506, 3-507, 3-602-3-604, vol. 3A 8-46-8-52, vol. 38 14-20 and 14-21.
International Preliminary Report on Patentability for Application No. PCT/US2017/012828, dated Aug. 23, 2018, 13 pages.
International Search Report and Written Opinion received for PCT Patent Application No. PCT/US2017/012828, dated Apr. 19, 2017, 16 pages.
Notice of Allowance, U.S. Appl. No. 15/019,112, dated Jan. 11, 2021, 5 pages.
Office Action, CN App. No. 201780010719.5, dated Apr. 6, 2021, 06 pages of Original Document Only.
Robert Schone, "Wake-up Latencies for Processor Idle States on Current x86 Processors", 5th International Conference on Energy-Aware High Performance Computing, 2014, pp. 1-22 (Year: 2014).
Second Office Action, CN App. No. 201780010719.5, dated Oct. 19, 2021, 10 pages (6 pages of English Translation and 4 pages of Office Action).
Notification to Grant Patent Right for Invention, CN App. No. 201780010719.5, dated Feb. 7, 2022, 6 pages (3 pages of English Translation and 3 pages of Original Document).
Office Action, DE App. No. 112017000721.6, dated Feb. 9, 2022, 16 pages of Original Document Only.

* cited by examiner

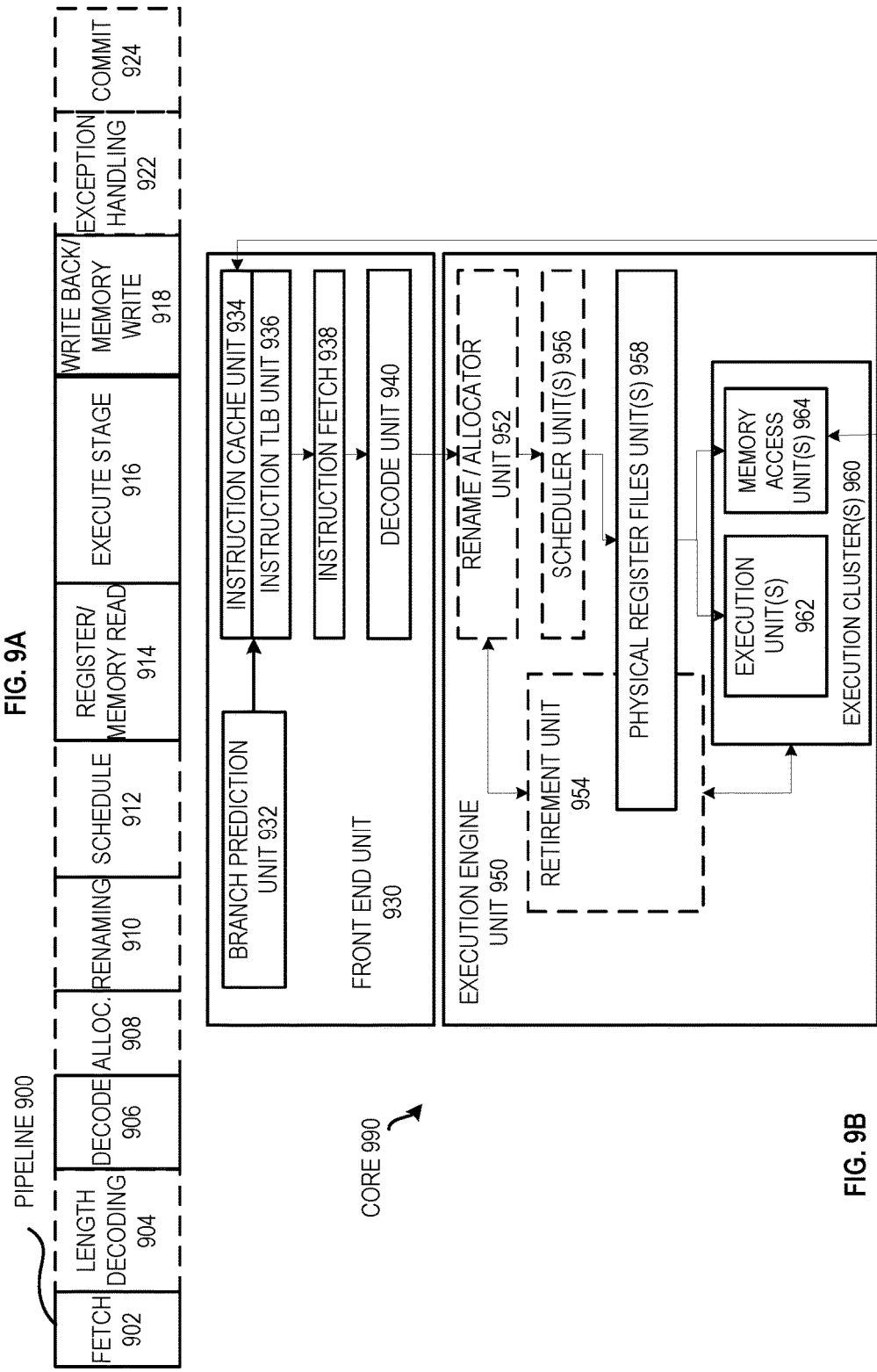
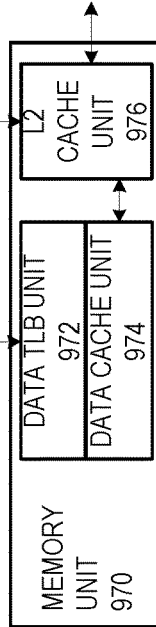
FIG. 9A
FIG. 9B

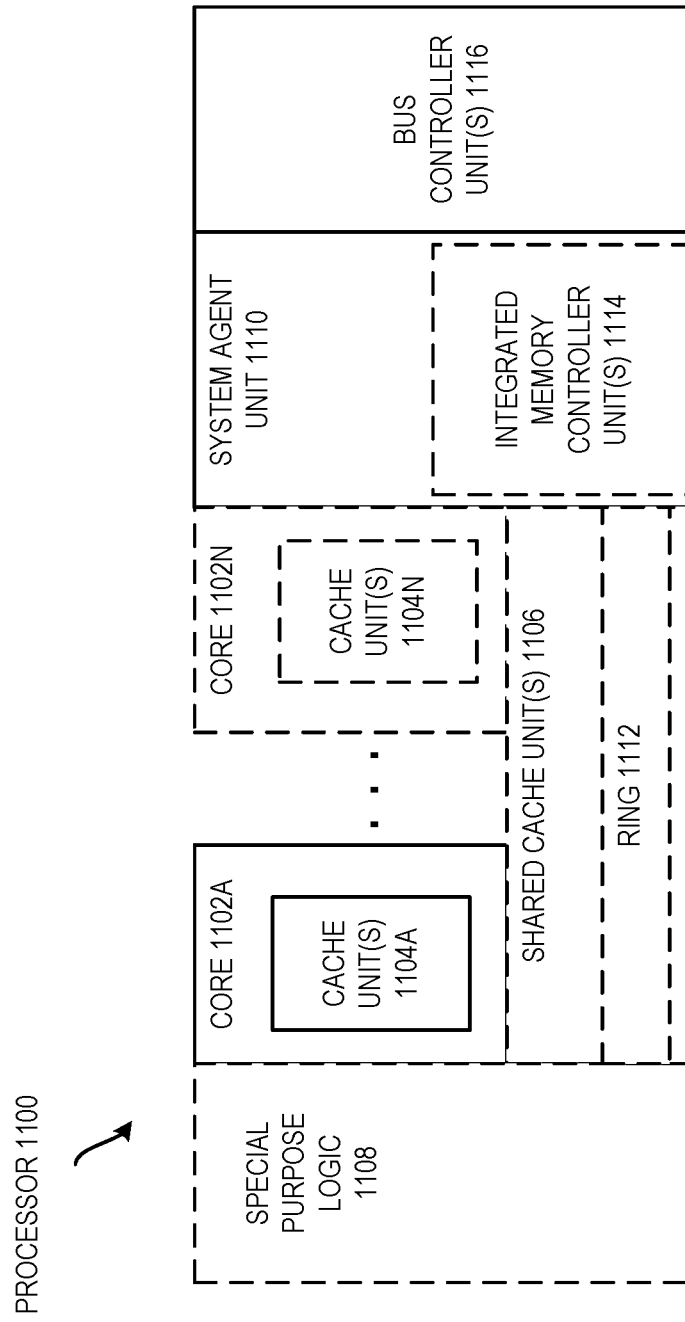

METHODS, APPARATUS, AND INSTRUCTIONS FOR USER-LEVEL THREAD SUSPENSION

RELATED APPLICATIONS

This application is a continuation of U.S. patent application Ser. No. 15/019,112, filed on Feb. 9, 2016, which is hereby incorporated herein by reference.

BACKGROUND

Technical Field

Embodiments described herein generally relate to processors. In particular, embodiments described herein generally relate to suspending the execution of threads in processors.

Background Information

Software threads often communicate or synchronize through changes to shared memory locations. As one example, the shared memory locations may be changed when locks or semaphores become available. As another example, the shared memory locations may be changed when work to be performed by a software thread is available (e.g., in a work queue).

One possible approach that a software thread may use to detect when a change is made to a shared memory location is to implement a polling loop, for example an idle loop, busy loop, busy-waiting loop, or the like. During the loop, the software thread may repeatedly execute instructions to test whether the shared memory location has been changed.

BRIEF DESCRIPTION OF THE DRAWINGS

The invention may best be understood by referring to the following description and accompanying drawings that are used to illustrate embodiments. In the drawings:

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

FIG. 11 is a block diagram of an embodiment of a processor that may have more than one core, may have an integrated memory controller, and may have integrated graphics.

DETAILED DESCRIPTION OF EMBODIMENTS

Disclosed herein are user-level suspend thread instructions, processors to execute the instructions, methods performed by the processors when processing or executing the instructions, and systems incorporating one or more processors to process or execute the instructions. In the following description, numerous specific details are set forth (e.g., specific instruction operations, processor configurations, microarchitectural details, logic partitioning/integrating decisions, sequences of operations, etc.). However, embodiments may be practiced without these specific details. In other instances, well-known circuits, structures and techniques have not been shown in detail to avoid obscuring the understanding of the description.

Figure 1:
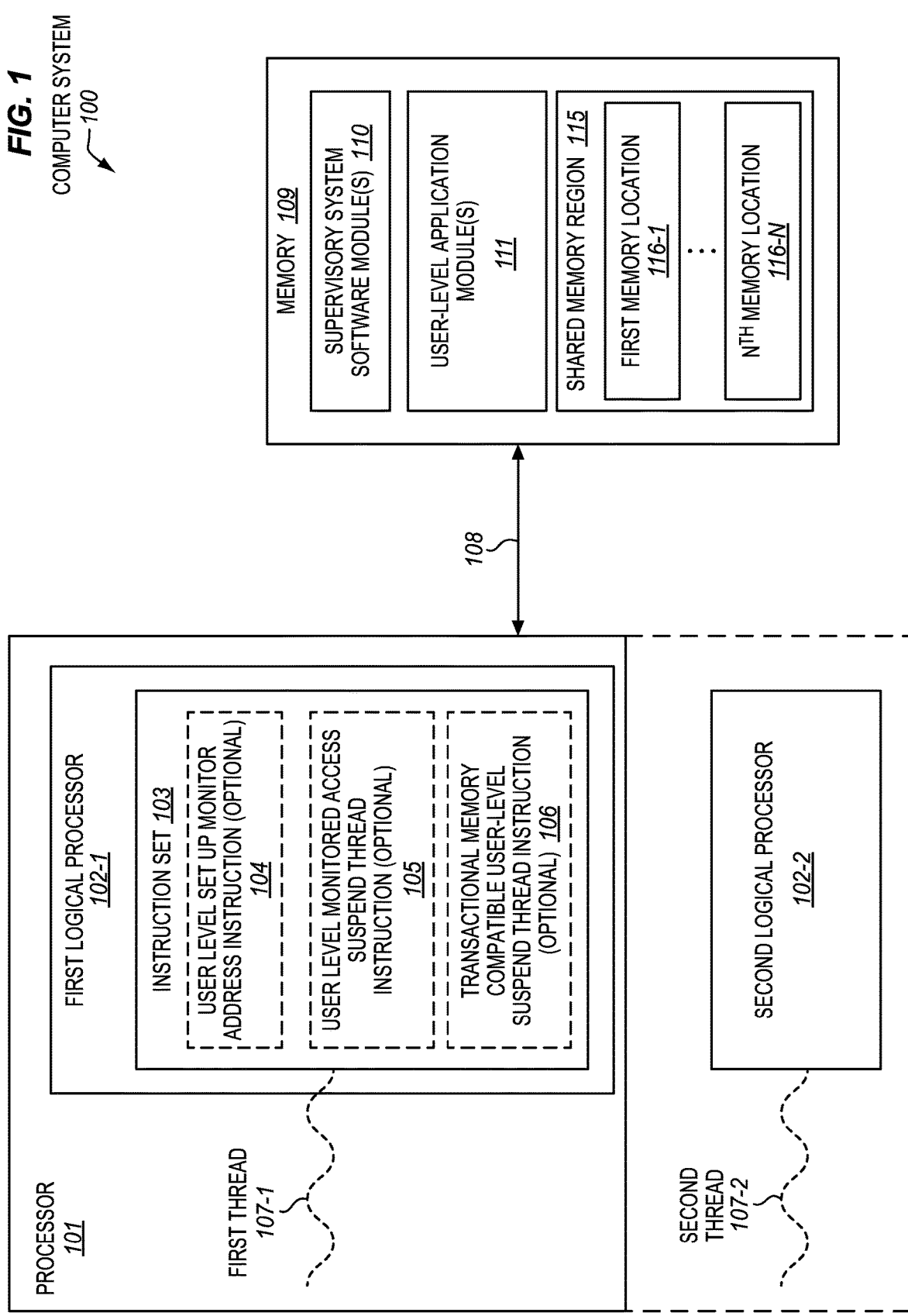
FIG. 1 is a block diagram of an embodiment of a computer system in which embodiments of the invention may be implemented.

FIG. 1 is a block diagram of an embodiment of a computer system 100 in which embodiments of the invention may be implemented. The system includes at least one processor 101. The processor 101 is coupled with, or otherwise in communication with, a memory 109 by a coupling mechanism 108. The memory may include one or more memory devices of the same or different types. Various conventional ways of coupling a processor with a memory are suitable. For example, the coupling mechanism may include one or more buses, hubs, memory controllers, chipset components, or the like, and various combinations thereof. In various embodiments, the computer system may represent a desktop computer, a laptop computer, a notebook computer, a tablet computer, a netbook, a smartphone, a server, a network device (e.g., a router, switch, etc.), or other type of system having one or more processors.

In some embodiments, the processor 101 may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The processor 101 includes at least a first logical processor 102-1. The processor 101 may optionally include the first logical processor 102-1 as a single logical processor, or the processor may optionally include multiple such logical processors. The computer system also includes at least a second logical processor 102-2, and may optionally include other logical processors. Dashed lines are used to show that the second logical processor may either be part of the processor 101, or may be external to the processor 101. By way of example, the second logical processor, may optionally be included on a second processor (e.g., a second die) or in another component (e.g., a direct memory access (DMA) device).

Examples of suitable types of logical processors include, but are not limited to, single threaded cores, hardware threads, thread units, thread slots, logical processors having dedicated context or architectural state storage and a program counter, logical processors having dedicated context or architectural state storage and a program counter on which software may be independently scheduled on, and the like. The term core is often used to refer to logic located on an integrated circuit that is capable of maintaining an independent architectural state (e.g., an execution state), and in which the architectural state is associated with dedicated execution and certain other dedicated resources. In contrast, the term hardware thread is often used to refer to logic located on an integrated circuit that is capable of maintaining an independent architectural state, and in which the architectural state shares access to execution and certain other resources. Depending on which resources are shared and dedicated in a given implementation the line between such usage of the terms core and hardware thread may tend to be less distinct. Nevertheless, the cores, hardware threads, and other logical processors are generally viewed by software as individual logical processors or processor elements. Generally, software (e.g., software threads, processors, workloads, or the like) may be scheduled on, and independently associated with, each of the logical processors.

The memory may store one or more supervisory system software modules 110, for example, one or more operating system modules, one or more virtual machine monitor modules, one or more hypervisors, or the like. The memory may also store one or more user-level application modules 111. A few representative examples of such user-level application modules are word processor application modules, spreadsheet modules, email application modules, internet browser modules, network application modules, video game application modules, and the like. The scope of the invention isn't limited to any known type of application modules. During operation, the supervisory system software module(s) may schedule a first software thread 107-1 on the first logical processor, and schedule a second software thread 107-2 on the second logical processor.

While running, the first and second software threads 107 may be operative to access a shared memory region 115. As shown, the shared memory region may include a first shared memory location 116-1 through an Nth shared memory location 116-N, where the number N may represent any reasonable number appropriate for the particular implementation. The shared memory locations may optionally also be shared by other software threads. In some cases, the first software thread may want to monitor and detect when the second software thread (or another software thread) has written to and/or modified one or more of these memory locations. As one illustrative example, this may be the case in conjunction with synchronization. Representatively, the different memory locations may represent locks, semaphores, consumer-producer mailboxes, or the like. A software thread may modify a given memory location when an associated lock or semaphore becomes available, and the first software thread may want to be able to monitor the memory location so that it can determine when the lock or semaphore becomes available. As another illustrative example, this may be the case in conjunction with work scheduling. Representatively, the different memory locations may represent work queues, or flags to indicate that work is in associated work queues. The second software thread (or another software thread) may modify a memory location when there is work for the first software thread to do, and the first software thread may want to be able to monitor the memory location, so that it can determine when there is available work to perform.

One possible way that the first software thread 107-1 may be able to monitor and detect when a given one of the memory locations 116 has been modified, is to perform an idle loop, busy loop, busy-waiting loop, or other such polling loop. Such loops generally represent the thread simply spinning in a generally tight loop repeatedly execution instructions to constantly check or poll whether the modification of the memory location has occurred. However, such loops generally tend to have certain drawbacks at least for certain implementations. For one thing, such loops generally tend to consume power without any real work being performed or any significant forward computational progress. Also, such loops generally tend to occupy resources of the processor that could otherwise potentially be used by one or more other threads (e.g., in the case of a simultaneous multithreaded (SMT) core). Another possible approach is through sleeping. However, sleeping generally tends to be more involved and longer latency than such polling loops, since it involves a transition to the operating system and back. For example, the operating system may maintain a list or wait queue of threads wishing to wait. A thread may put itself on the wait queue, and ask the operating system to wake it up whenever an event happens (e.g., a write to a memory address occurs). However, such sleeping generally tends to have high overhead and latency for user-level applications due in part to a need to yield or transition to the operating system or other supervisory software and back (e.g., perform a system call instruction to yield to the operating system through a first ring transition, and resume from the operating system through a second ring transition). This tends to make the reaction time of user-level code relatively slow. For very short wait times, such polling loops may not be overly problematic and may avoid high latencies associated with yielding to the operating system to sleep. Conversely, for very long wait times, the high latencies associated with yielding to the operating system to sleep also may not be overly problematic. However, especially for medium duration wait times, such polling loops or yielding to the operating system to sleep, both generally tend to be more problematic. Alternative approaches may therefore offer certain potential advantages especially for intermediate duration periods of time.

Referring again to FIG. 1, the first logical processor 102-1 has an instruction set 103. In some embodiments, the instruction set may include an embodiment of an optional user-level set up monitor address instruction 104, an embodiment of an optional user-level monitored access suspend thread instruction 105, and an embodiment of an optional transactional memory compatible user-level suspend thread instruction 106. In some embodiments, the instruction set may include as few as only any one of these instructions. The instructions 104, 105, 106 are user-level instructions, which may be performed at user-level privilege, as well as at higher privilege levels (e.g., by supervisory system software). In some embodiments, the user-level monitored access suspend thread instruction 105 may allow user-level software (e.g., one of the user-level application module(s) 111) to suspend a thread, and use a monitor mechanism, which has been set up by the user-level set up monitor address instruction 104, to know when one of the shared memory locations 115 has been accessed.

Advantageously, there may be no need to perform an idle, busy, or other loop, or even perform any subsequent instructions. In addition, since the user-level monitored access suspend thread instruction is a user-level instruction, which are allowed to be performed at user-level privilege (as well as at higher privilege levels), there is no need or requirement for a user-level application (e.g., one of the user-level application module(s) 111) to yield or otherwise transition to supervisory system software (e.g., one of the supervisory system software modules 110), in order for the instruction to be performed. Rather, the instruction may be performed while in, and without leaving, the user-level privilege, and without needing to perform a ring transition or other transition to a higher level of privilege. Further, this may often allow better responsiveness to the user-level thread by allowing it to suspend and resume more quickly, for example, to handle indications like "you've got mail" or "go fetch". In one aspect, although embodiments certainly are not limited to such, the ability to perform the instructions at user level may help to allow lower latencies which may be used in conjunction with modifications of data by an on-die hardware accelerator on a same chip or die as the logical processor, for example. Such on-die hardware accelerators generally have low latency and it is often desirable for user-level threads to drive or otherwise interface with them because trips through privileged system software and back are longer latency.

Figure 2:
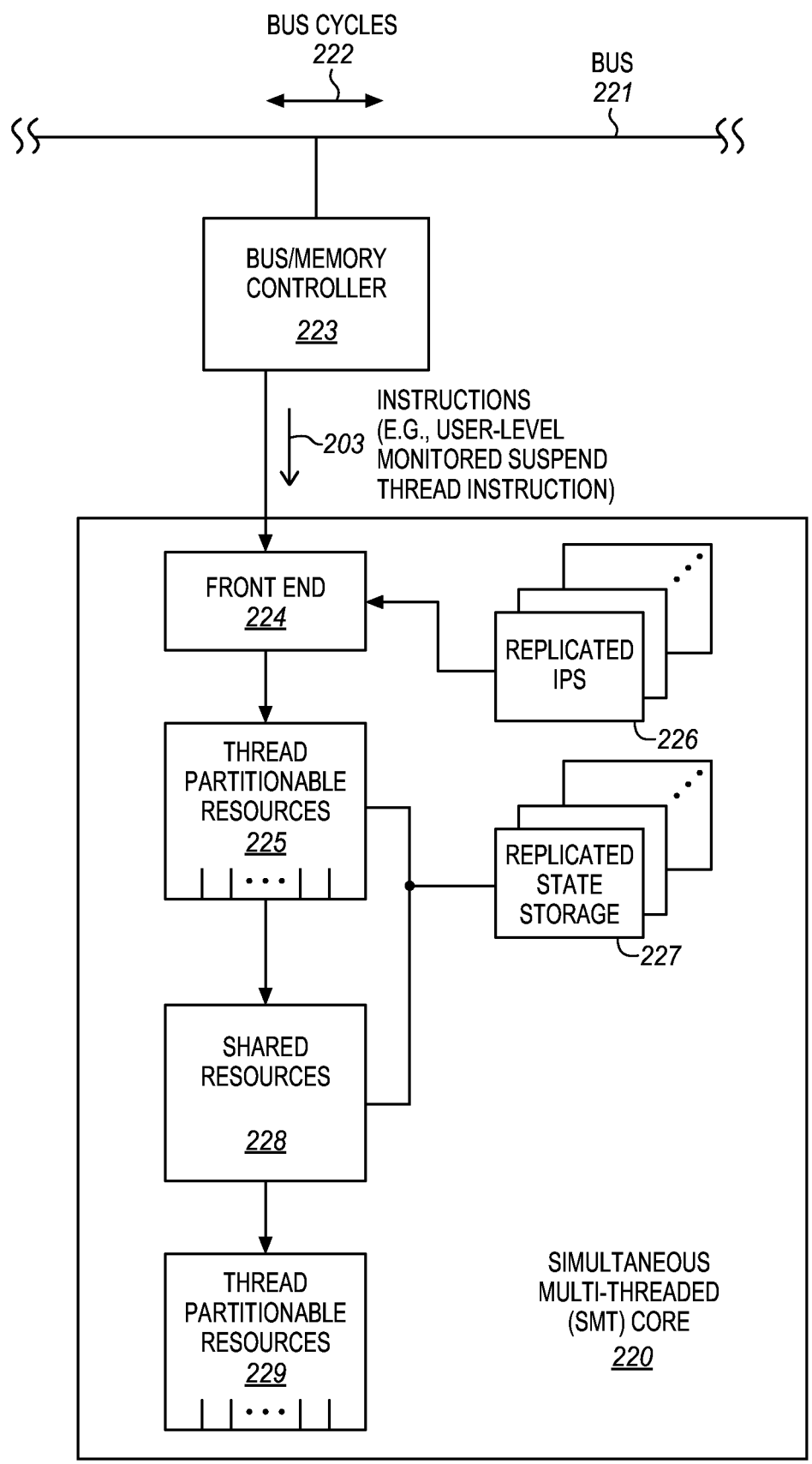
FIG. 2 is a block diagram of an example embodiment of a simultaneous multithreaded (SMT) core that is suitable for embodiments.

FIG. 2 is a block diagram of an example embodiment of a simultaneous multithreaded (SMT) core 220 that is suitable for embodiments. The SMT core may include a plurality of hardware threads that may each represent a logical processor or processor element. Each logical processor may be operative to perform a different software thread. In this way, multiple different software threads may be performed on the SMT core concurrently.

The core 220 is coupled with a bus or other interconnect 221 by a bus and/or memory controller 223. The bus/memory controller may provide instructions 203 for execution to a front end 224 of the core. These instructions may include the instructions of an instruction set of the core (e.g., the instruction set 103), including at times any one or more of the user-level set up monitor address instruction 105, the user-level monitored access suspend thread instruction 106, and the transactional memory compatible user-level suspend thread instruction 107. The front end may include an instruction fetch unit and a decode unit. The instruction fetch unit may fetch instructions for multiple threads being performed by the core according to multiple corresponding replicated instruction pointers (IPs) 226. The instruction pointers may be replicated per thread to support the multiple threads. The decode unit may decode the received instructions for each of the threads.

The decoded instructions or control signals may be provided from the front end to a first set of thread partitionable resources 225 for further processing. By way of example, the first set of thread partitionable resources may include decoded instruction queues. The thread partitionable resources may include logically separated partitions that may each be dedicated to a particular thread when multiple threads are active within the core. In some embodiments, each separate partition may only contain instructions from the corresponding thread to which that partition is dedicated. As will be explained further below, in some alternate states, when the core is in a single thread mode, the partitions of the first set of thread partitionable resources may optionally be annealed or otherwise combined to form a single large partition that is dedicated to one single thread (or any remaining executing threads). Partitioning and combining of the partitionable resources may be performed according to which threads are active or suspended in the core.

The core also includes multiple sets of replicated state storage 227. For example, there may be one set of replicated state storage for each of the threads that is active on the core and/or for each hardware thread of the core. The replicated state storage may include, for example, architectural registers and other storage used to store state or context. Each set of replicated state storage may be operative to store state sufficient to maintain the context or architectural state for the corresponding hardware thread or logical processor. By replicating the state storage, the multiple threads may execute substantially without competition for state storage. Additionally, associated register allocation logic may be replicated for each thread. The replicated state-related logic may operate with the appropriate resource partitions to prepare incoming instructions for execution.

The first set of thread partitionable resources 225 may provide decoded instructions to shared resources 228. For example, the first set of partitionable resources may feed instructions from multiple threads to the shared resources by alternating between the threads (e.g., in a fair or generally alternating manner) that attempts to provide continued progress on each active thread. For example, thread selection multiplexing logic may alternate between and partitioned resources to provide reasonable access to each of the active threads. The shared resources may operate on the instructions of the multiple threads. By way of example, the shared resources may include a scheduler, execution units, and a pool of registers in the register read and write portions of the pipeline.

A second set of thread partitionable resources 229 may be coupled with an output of the shared resources 228. The second set of thread partitionable resources may include retirement or commit resources, such as, for example, as a re-order buffer or the like. The second set of thread partitionable resources may commit instructions from each thread and update the appropriate architectural state for the threads.

It is to be appreciated that this is just one illustrative example of a suitable SMT core. In other embodiments, the shared and thread partitionable resources may be arranged differently. For example, there may not be partitionable resources at both ends of the shared resources. In addition, in other embodiments, the partitionable resources may not be strictly partitioned, but rather may allow some instructions to cross partitions and/or may allow partitions to vary in size depending on factors such as the particular thread being executed with that partition and the total number of threads being executed. Additionally, different mixes of resources may be designated as shared, duplicated, and partitioned resources.

One potential advantage of the SMT core is that it may help to improved processor utilization through allowing multiple software threads to be performed on a single core. This may be especially the case when the core has a highly parallel architecture such that it may otherwise tend to be challenging at times to extract sufficient parallelism from a single thread to utilize all of the execution units. However, with SMT multiple threads may be performed concurrently in the different execution resources in an attempt to better utilize those resources. Also, such an SMT core may tend to be helpful for applications that encounter high latency delays or which often wait for events to occur. When one thread is waiting for a high latency task to complete or for a particular event, a different thread may be processed.

Figure 3:
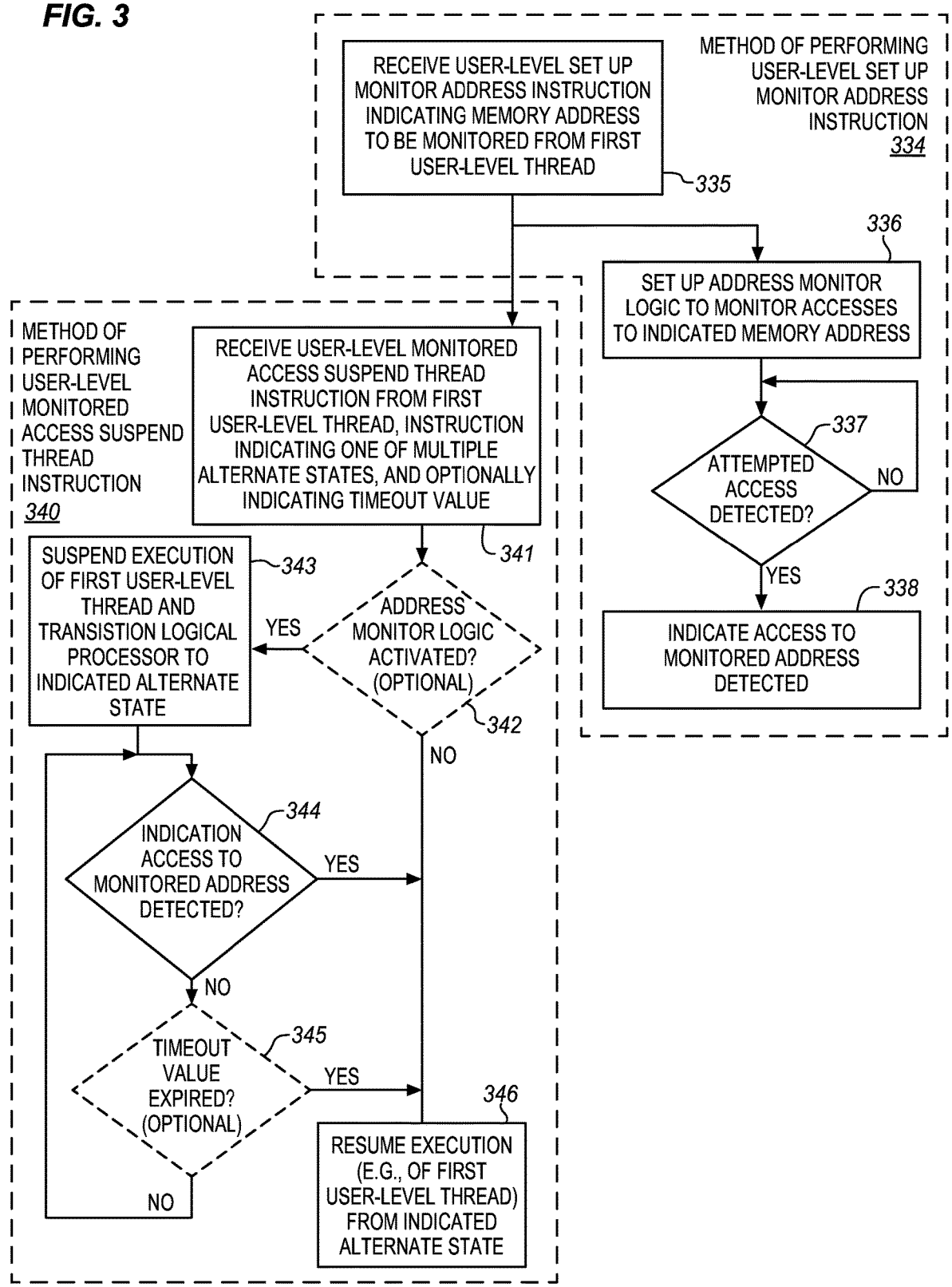
FIG. 3 is a block flow diagram of an embodiment of a method of performing a user-level set up monitor address instruction, and an embodiment of a method of performing a user-level monitored access suspend thread instruction.

FIG. 3 is a block flow diagram of an embodiment of a method 334 of performing a user-level set up monitor address instruction, and an embodiment of a method 340 of performing a user-level monitored access suspend thread instruction. In some embodiments, these two instructions may be useable together to suspend a thread while waiting for a monitored write/store access to a memory location. Alternatively, a single instruction may combine the operations of both instructions. In various embodiments, the methods may be performed by a processor, instruction processing apparatus, digital logic device, or integrated circuit.

Referring first to the method 334 of performing the user-level set up monitor address instruction. The method includes receiving the user-level set up monitor address instruction from a first user-level thread, at block 335. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.).

In some embodiments, the user-level set up monitor address instruction may explicitly specify (e.g., through one or more fields or a set of bits), or otherwise indicate (e.g., implicitly indicate through the opcode), a memory address is to be monitored (e.g., monitored for write/store accesses to the memory address). The instruction may "indicate" the monitor address in that it may convey enough information to allow the processor to determine the address to be monitored, possibly with the use of other information and/or information in one or more registers (e.g., a segment register, etc.). In one aspect, the instruction may indicate a linear address that has a corresponding physical address (e.g., based on address translation) that is to be monitored for accesses. As other examples, the monitored address may be given in a virtual address format, or may be indicated as a relative address, or may be specified in other known or convenient address-specifying manners. The monitor address may indicate various units of memory for monitoring. For example, in some embodiments, memory address may indicate a cache line. Alternatively, the memory address may indicate a portion of a cache line, a specific/selected size portion or unit of memory which may bear different relationships to the cache line sizes of different processors, or a single address. The monitor address thus may indicate a unit that includes data specified by the operand (and more data) or may indicate specifically an address for a desired unit of data. In some embodiments, the memory address or range indicated may be of write-back caching type.

In some cases, the instruction may optionally have a source operand specification field to specify a register (e.g., a general-purpose register) or other storage location that is to store information to indicate the memory address to be monitored. In other cases, a register (e.g., a general-purpose register) or other storage location that is to store information to indicate the memory address to be monitored may optionally be implicit to the instruction (e.g., implicit to an opcode of the instruction). For example, a processor may implicitly understand, based on recognition of the opcode, that the register or other storage location is used to store the information to indicate the memory address, even though the instruction does not explicitly specify or expressly identify that register or other storage location. Software may store the information indicating the memory address to be monitored in the register or other storage location before the user-level set up monitor address instruction is performed.

At block 336, address monitor logic of the processor may be set up or configured to monitor accesses to the memory address indicated by the user-level set up monitor address instruction in response to and/or as a result of the user-level set up monitor address instruction. In some embodiments, this may include informing the address monitor logic of the memory address to be monitored. For example, the memory address to be monitored may be stored in a non-architectural register or other storage location within and/or accessible to the address monitor logic. In some embodiments, this may also optionally include increasing the observability of writes/stores to the monitored address (e.g., to have caching agents make write operations that will affect information stored at the address monitor logic visible to the address monitor logic). In some embodiments, setting up or configuring the address monitor logic to monitor accesses to the memory address may also include turning on, activating, or enabling the address monitor logic to monitor for accesses (e.g., write accesses) to the memory address.

In some embodiments, the address monitor logic used for the monitoring may include predominantly or only on-die logic of the processor. For example, the address monitor logic may be implemented fully or at least predominantly in on-die hardware (e.g., integrated circuitry, transistors or other circuit elements, etc.), on-die firmware (e.g., ROM, EPROM, flash memory, or other persistent or non-volatile memory and microcode, microinstructions, or other lower-level instructions stored therein), or a combination thereof. In other embodiments, the address monitor logic may include on-die hardware and/or on-die firmware optionally/potentially with some software. The address monitor logic may also be referred to herein simply as a monitor, address monitor, or monitor unit.

At block 337, the set up or configured address monitor logic may monitor for accesses to the indicated memory address. Once activated or enabled the address monitor logic may begin to operate continuously, in parallel with other operations in the processor, to monitor for such accesses. The address monitor logic may include comparison logic to compare the memory address to be monitored against bus cycle information (e.g., received from the bus and/or memory controller). Memory access information may be obtained from internal and/or external buses of the processor. In some embodiments, physical addresses may be compared. For example, a linear or other logical address indicated by the instruction may be translated by address translation logic (e.g., a translation lookaside buffer (TLB), page miss handler, or the like) to obtain the physical address. In such embodiments, the address monitor logic may watch for any bus cycle that indicates an actual or potential write to that physical address. Such a cycle may be in the form of an explicit write cycle and/or may be a read for ownership or an invalidating cycle by another agent attempting to take exclusive ownership of a cacheable line so that it can write to that line without an external bus transaction. In the case of a read to the monitor address, coherency related logic may be activated and may assert a signal (e.g., a HIT# signal) to help prevent another agent from gaining ownership which would allow future writes without coherency broadcasts. If an access to the monitored memory address (e.g., an associated cache line or address range) is detected, the method may advance to block 338. Otherwise, the address monitor logic may continue to monitor for attempted accesses until it is deactivated.

At block 338, the address monitor logic and/or the processor may indicate that an attempted write/store access to the monitored address has been detected. This indication may be given in different ways in different embodiments. In various embodiments, this indication may be given by setting or otherwise modifying a bit, storing or modifying value in a register or memory location, transmitting or asserting a signal (e.g., a write detected signal), incrementing a counter, or the like. In some embodiments, this indication may represent that another logical processor has modified a shared memory location (e.g., indicating that a lock or semaphore is available, indicating the availability of work to be performed in a queue, etc.). As will be explained further below, in some embodiments, this indication may be used to resume execution of a suspended thread.

Referring again to FIG. 3, next the method 340 of performing the user-level monitored access suspend thread instruction will be described. The user-level monitored access suspend thread instruction may be received, at block 341. In some embodiments, the user-level monitored access suspend thread instruction may be received from the same first user-level thread (e.g., from which the user-level set up monitor address instruction was received at block 335).

In some embodiments, the user-level monitored access suspend thread instruction may optionally specify or otherwise indicate a timeout value (e.g., as a source operand). The timeout value may represent a limiting or maximum value, as indicated by the user-level monitored access suspend thread instruction, for the first user-level thread to be in a suspended state, in the event that an access to the monitored address and/or other resume thread event is not detected beforehand. The timeout value may be expressed in various different ways, such as, for example, a value up to which a counter is to be incremented, a value down to which a counter is to be decremented, a value down from which a counter is to be decremented to zero, a value up to which a timer is to count, a value down to which a timer is to count, a value down from which a timer is to count to zero, a global clock or other clock time duration, a final global clock or other clock time, a number of processor clock cycles, or the like. For clarity, the timeout value or time may represent variously an increment of time, a duration of time, or an actual stop time (e.g., to illustrate the difference, resume at time 8:01:32:32, or resume in 1/10000 of a second from now).

The timeout value may represent a user-level value (e.g., provided by a user-level application and/or at a user-level privilege). A programmer and/or a user-level application may select the timeout value depending on how long the suspension should be. In some embodiments, the instruction may have bits or a field to specify or otherwise indicate the timeout value. As one example, the instruction may have a 4-bit, 6-bit, 8-bit, or other bit-length immediate to specify the timeout value. In other embodiments, the instruction may have bits or a field to indicate a register or other storage location that is to store information to specify or otherwise indicate the timeout value. Alternatively, such a register or other storage location may optionally be implicit to the instruction (e.g., implicit to an opcode thereof). Alternatively, a fixed user-level timeout value may optionally be used for the instruction (e.g., fixed for and/or implicit to the opcode).

In some embodiments, the user-level monitored access suspend thread instruction may specify or otherwise indicate a given one of optionally multiple possible alternate states allowed for the instruction into which the associated logical processor is to be transitioned when the first user-level thread is suspended. In some embodiments, an opcode of the user-level monitored access suspend thread instruction may optionally allow for any one of such multiple possible alternate states, and another non-opcode portion of the instruction may indicate one of the multiple possible alternate states. Alternatively, in other embodiments, different opcodes may optionally be used for different states.

The instruction may specify or otherwise indicate the alternate state in different ways in different embodiments. In some embodiments, the instruction may have one or more bits or a field that may have different values to specify, select, or otherwise indicate a given one of the multiple possible alternate states. As one illustrative example, a single bit of the instruction may have a first value (e.g., be set to binary one) to indicate a first alternate state, or a second different value (e.g., be cleared to binary zero) to indicate a second different alternate state. Alternatively, two or more bits may optionally be used to select between three or more different possible alternate states. In other embodiments, the instruction may have bits or a field to specify or indicate a register or other storage location that is to store information to specify, select, or otherwise indicate a given one of two or more possible alternate states. Alternatively, such a register or other storage location may optionally be implicit to the instruction (e.g., implicit to an opcode thereof). In still other embodiments, the magnitude of the timeout value indicated by the instruction may itself be used to indicate the given one of the multiple different possible alternate states. As one illustrative example, the magnitude of the timeout value being less than a threshold or predetermined value may indicate a first alternate state, or the magnitude of the timeout value being greater than the threshold or predetermined value may indicate a second different alternate state. Three or more different states may be implemented analogously by using two or more different threshold or predetermined values.

Allowing the instruction to indicate a given one of multiple possible alternate states may help to allow a programmer and/or user-level software to indicate a preference for how long the latency should be to resume execution and/or how aggressive a power conservation state should be used while the thread is suspended, but is not required. In some embodiments, the multiple possible alternate states may include a logical processor relatively longer resume execution latency state (e.g., a nap state), and a logical processor relatively shorter resume execution latency state (e.g., a lighter nap state). As used herein, "longer" and "shorter" are used as relative terms (i.e., relative to one another), not absolute terms. Moreover, the "lighter" in the "lighter nap" state means that it is lighter relative to the nap. In some embodiments, the relatively longer resume execution latency state (e.g., a nap state) may also have relatively more aggressive power conservation measures, and the relatively shorter resume execution latency state (e.g., the lighter nap state) may have relatively less aggressive power conservation measures. Again, "more" and "less" in this context are used herein as relative terms (i.e., relative to one another), not absolute terms. If desired, the multiple states may optionally include three or more different states each with a different relative resume execution latency and/or level of power conservation aggressiveness.

In some embodiments, at least one, or in some embodiments optionally all, of the one or more possible/allowed alternate states for the user-level monitored access thread suspend instruction, may have resume execution latencies that are less than, or at least no longer than, that of the C1 or halt processor power state, as defined by the current version of Advanced Configuration & Power Interface (ACPI). The resume execution latency from the C1, or halt processor power state of ACPI, is sometimes said to be "essentially instantaneously," although in reality it generally takes on the order of one thousand clock cycles. As used herein, the "C1 state" and the "halt processor power state" refers to those defined by ACPI. Representatively, since the instruction is a user-level instruction, in some cases it may be useful if the user-level code can be allowed to, or in some embodiments can only be allowed to, have resume execution latencies that are shorter than, or at least no longer than, that of the C1 or halt processor power state. As one possible example, supervisory system software may not want user-level code to be able to autonomously enter alternate states as deep as the C1, or halt processor power state, so that the supervisory system software can have more control over platform power management. As one possible reason, performance-monitoring counters and/or another approach that the supervisory system software may use to measure the amount of time spent in different C-states may potentially be inaccurate if the user-level code is allowed to autonomously enter the C1 or halt processor power state, or deeper sleep states.

In some embodiments, the instruction may optionally allow a first alternate state (e.g., a lighter nap state), which may be represented in ACPI C-state notation as a C0.1 state. In some embodiments, the C0.1 state may have a resume execution latency that is no longer than about half the resume execution latency of the C1 or halt processor power state of ACPI (e.g., no more than about five hundred clock cycles). In various embodiments, the resume execution latency of the C0.1 state may be no more than about one third that of the C1 or halt processor power state (e.g., no more than about three hundred thirty three clock cycles), no more than about one fourth that of the C1 or halt processor power state (e.g., no more than about two hundred fifty clock cycles), no more than about one-fifth that of the C1 or halt processor power state (e.g., no more than about two hundred clock cycles), no more than about one eighth that of the C1 or halt processor power state (e.g., no more than about one hundred twenty five clock cycles), or no more than about one tenth that of the C1 or halt processor power state (e.g., no more than about one hundred clock cycles). In some embodiments, the instruction may also optionally allow a second alternate state (e.g., a nap state), which may be represented in ACPI C-state notation as a C0.2 state. In some embodiments, the C0.2 state may have a resume execution latency that is slightly shorter than, or are at least no longer than, that of the C1 or halt processor power state (e.g., no longer than on the order of about one thousand clock cycles).

In some embodiments, by allowing the user-level instruction to only have resume execution latencies that are not significantly more than that of the aforementioned C0.2 state, it may retain the restriction that only supervisory system software can enter sleep states as deep as the C1 or halt processor power state. In some embodiments, performance-monitoring counters and/or another approach that the supervisory system software may use to measure the amount of time spent in different C-states may potentially treat time spent in C0.1 or C0.2 as time spent in the C0 or active state of ACPI. In other words, even though the C0.2 state may potentially have similar resume latencies and/or similar power savings as the C1 or halt processor power state, the supervisory system software may treat it as an active state which would not be the case for the C1 or halt state.

Referring again to FIG. 3, in some embodiments, the processor may optionally perform an initial determination whether the address monitor logic is activated, at block 342. This may optionally be done before suspending execution of the first user-level thread. By way of example, when setting up the address monitor logic is performed responsive to a different instruction, this may help to ensure that the address monitor logic is actually set up and activated which may help to avoid a potential condition where the first thread may be suspended longer than desired because the address monitor logic was not actually activated. However, this is optional not required. If the determination is that the address monitor logic is activated (i.e., "yes" is the determination), the method may advance to block 343. Otherwise, if the address monitor logic is not activated (i.e., "no" is the determination), the method may advance to block 346.

At block 343, execution of the first user-level thread may be suspended and the logical processor on which the first user-level thread was running may be transitioned to the indicated alternate state, in response to the user-level monitored access suspend thread instruction (e.g., in response to the instruction being decoded). As used herein, suspending the execution of the thread includes temporarily stopping performing additional instruction of the thread until the thread is resumed. In some embodiments, the way in which the logical processor is transitioned to the indicated alternate state may be based on and/or dependent on the alternate state indicated by the user-level monitored access suspend thread instruction. For example, in some embodiments, the set of actions taken to transition the logical processor (e.g., in conjunction with freeing processor resources for use by another thread) when a relatively shorter resume execution latency state (e.g., a lighter nap state) is indicated may be different in at least some ways than the set of actions taken when a relatively longer resume execution latency state (e.g., a nap state) is indicated.

For example, in some embodiments, one or more sets of partitionable resources previously initially allocated to the first user-level thread (e.g., running on a first SMT hardware thread) may not be fused or annealed for use by a second software thread (e.g., running on a second SMT hardware thread of the same core) when a relatively shorter resume execution latency state (e.g., a lighter nap state) is indicated, but these one or more sets of partitionable resources may be fused or annealed for use by the second software thread when a relatively longer resume execution latency state (e.g., a nap state) is indicated. For example, when the relatively shorter resume execution latency state entered, the first user-level thread may be suspended, but may retain relatively more of its partitionable resources. Throughput may still be enhanced because shared resources may be used exclusively by the other thread(s) while the first user-level thread is suspended. Conversely, when the relatively longer resume execution latency state entered, the first user-level thread may be suspended, and also relatively more of its partitionable resources (e.g., any of those discussed for FIG. 2) that were previously dedicated to the first user-level thread may be relinquished while it is suspended. This may allow other thread(s) to use these resources which may help to increase the throughput of these other thread(s). Relinquishing these resources, however, may come at a cost of some increased resume execution latency associated with fusing/combining these partitionable resources. Accordingly, such partitionable resources may be fused/combined for relatively longer intended resume execution latencies but not, or at least not so much, for relatively shorter intended resume execution latencies. This is just one illustrative example. In other embodiments, the two states may be treated differently micro-architecturally in other ways. For example, in another embodiment, in a shorter resume execution latency state (e.g., a lighter nap state or C0.1 state) clocks may not be stopped or gated to at least some hardware resources, whereas in a longer resume execution latency state (e.g., a nap state or C0.2 state) clocks may be stopped or gated to these hardware resources.

It was discussed above for block 343 that the processor, in response to the instruction, may suspend the execution of the first user-level thread, and transition the logical processor into the indicated alternate state. It is to be appreciated that this discussion encompasses the possibility, in some embodiments, that the processor may optionally first determine or ensure that one or more conditions are satisfied. By way of example, these condition(s) may be related to whether the processor will be able to resume execution and/or detect resume thread execution events and/or other conditions in which it is not desirable to allow the logical processor to enter the indicated alternate state. The specific conditions used for the particular implementation may be due in part to model-specific and/or microarchitectural design. As one example, these conditions may determine if the processor doesn't currently have resources needed to reliably detect whether an access is being made to an address that would need to be monitored. In some embodiments, if such condition(s) are not satisfied, the processor may optionally decide to suspend the execution of the user-level thread and transition the logical processor into a different alternate state than the one indicated, or may decide not to suspend the execution of the user-level thread at all. Accordingly, suspending the execution of the user-level thread, and transitioning the logical processor into the indicated alternate state, in response to the instruction, encompasses conditioning this on one or more conditions being satisfied.

At blocks 344 and 345, determinations may be made whether or not to resume execution of the first user-level thread. Specifically, at block 344, a determination may be made whether there is an indication that access to the monitored memory address (e.g., the memory address indicated by the user-level set up monitor address instruction) has been detected. For example, in some embodiments, this determination may be associated with determining whether the address monitor logic has indicated that an access to the monitored address has been detected at block 338. In various embodiments, such a determination may be made by determining a value of a bit, a value in a register, or a value in a memory location, which indicates whether or not the access to the monitored address has been detected. In still other embodiments, such a determination may be made by determining whether a signal has been transmitted or asserted that indicates that the access to the monitored address has been detected. In some embodiments, determining that there is an indication that an access to the monitored memory location has been detected may represent a determination that another logical processor has modified a shared memory location at the memory address (e.g., indicating that a lock or semaphore is available, indicating the availability of work to be performed in a queue, or the like). Notice that no additional instructions need to be performed in order to resume the first user-level thread. Rather, the first user-level thread may remain suspended and the processor (e.g., the enabled address monitor logic and thread suspend and resume logic) may autonomously monitor and detect memory accesses to the monitored memory location and cause resumption of the first user-level thread without the need to execute any additional instructions. If there is an indication that an access to the monitored memory address has been detected (i.e., "yes" is the determination at block 344), the method may advance to block 346. Otherwise, there is not an indication that an access to the monitored memory address has been detected (i.e., "no" is the determination at block 344), the method may advance to block 345.

At block 345, a determination may optionally be made whether the user-level timeout value, which was indicated by the user-level monitored access suspend thread instruction, has expired. As previously mentioned, the use of this timeout value is optional not required. The timeout value may represent a maximum value, as indicated by the user-level monitored access suspend thread instruction, for the first user-level thread to remain in the suspended execution state. This determination may be made in different ways in different embodiments. For example, in various embodiments, this may include determining whether a counter that was started around the time when the first user-level thread was suspended has incremented up to the timeout value or has decremented down to zero or a stopping value starting from the timeout value, determining whether a period of time elapsed since around the time the first user-level thread was suspended is equal to or greater than the timeout value, determining whether the timeout value number of clock cycles have occurred since around the time the first user-level thread was suspended, or the like. If the timeout value has expired (i.e., "yes" is the determination at block 345), the method may advance to block 346. Otherwise, if the timeout value has not expired (i.e., "no" is the determination at block 345), the method may revisit block 344.

At block 346, execution (e.g., of the first user-level thread) may be resumed from the indicated alternate state into which the logical processor was previously transitioned. For example, if a "yes" determination was made at one of blocks 344-345 the execution of the first user-level thread may resume at a next instruction of the first user-level thread following the user-level monitored access suspend thread instruction, or if any interrupt or certain other event that should be handled by privileged software was detected (not shown) execution may transfer to a handler.

In some embodiments, the latency with which the execution may be resumed may depend upon the particular indicated alternate state. For example, the way in which the execution may be resumed from the indicated first alternate state may be based on and/or dependent on the specific indicated alternate state and what operations need to be performed to transition the logical processor back to an execution capable state. Often, this resumption may be substantially the reversal of the actions taken to transition the logical processor to the indicated alternate state at block 343. For example, in some embodiments, there may be no need to combine/fuse one or more sets of partitionable resources (e.g., which may remain partitioned and allocated to the first user-level thread) when execution is resumed from the relatively shorter resume execution latency state (e.g., a lighter nap state), whereas when execution is resumed from the relatively longer resume execution latency state (e.g., a nap state) previously fused/annealed resources may be repartitioned and reallocated.

In some embodiments, the indicated alternate state may have a lower resume execution latency than the C1 or halt processor power state of ACPI. In such embodiments, execution may be resumed, from when the logical processor is in the indicated alternate state, with a latency that is to be less than half, less than one third, less than one fourth, less than one fifth, less than one eight, less than one tenth, or even less, than a latency that execution of a thread can be resumed when the logical processor is in a C1 or halt processor power state of ACPI. In some embodiments, optionally one or more other possible/allowed alternate states may also optionally be supported with resume execution latencies that are also less than and/or at least not greater than those of the C1 or halt processor power state of ACPI. Providing the two or more alternate states may help to provide a tradeoff option for a programmer or user-level software to select between a relatively longer resume execution latency state which tends to improve performance of another SMT thread more by allowing more relinquishing of resources, and a relatively shorter resume execution latency state, which generally may not allow as much performance improvement by the other SMT thread, but which generally allows the first user-level thread to be resumed more quickly.

The methods 334 and 340 have been shown and described in a relatively basic form, although operations may optionally be added to and/or removed from the methods. For example, if desired, the method 340 may optionally be modified to remove the aspect that the processor or other apparatus allows multiple alternative possible states in conjunction with preforming the user-level monitored access suspend thread instruction and optionally remove the aspect that the user-level monitored access suspend thread instruction indicates one of these multiple possible alternate states. Rather, a single fixed alternate state may optionally be used (e.g., the lighter nap state). As another example, in other embodiments, the method 340 may optionally be modified to include imposing a supervisory system software and/or privileged-level maximum time or timeout value (e.g., as will be described further below in conjunction with FIG. 5). As yet another example, although for simplicity not shown, in some embodiments, the method 340 may optionally allow one or more other types of events to cause the first user-level thread to be resumed, although this is not required. For example, one or more additional determination blocks, similar to blocks 344 and 345, may optionally be added. In various embodiments, these determination blocks may determine whether or not a non-masked interrupt (NMI), a system management interrupt (SMI), a debug exception, a machine check exception, an initiation signal, a reset signal, certain types of external interrupt if they would be delivered to software, an event that changes address translation, or the like, has been detected, and if so cause the execution of the first user-level thread to resume. In addition, while the flow diagram illustration of the methods shows a particular order of operations, that order is just an example and is not required. Alternate embodiments may perform certain of the operations in different order, combine certain operations, overlap certain operations, etc. For example, the determinations at blocks 344 and 345 may optionally be performed in a different order and/or concurrently, etc.

In the above description, methods responsive to two different instructions (e.g., two different opcodes) have been shown and described. Using two different instructions to set up address monitor logic and suspend a thread may tend to provide a programmer added flexibility and/or tend to allow more efficient programming. Alternatively, in other embodiments, the aforementioned operations may instead be performed in response to and/or as a result of a single instruction (e.g., a single opcode).

Figure 4:
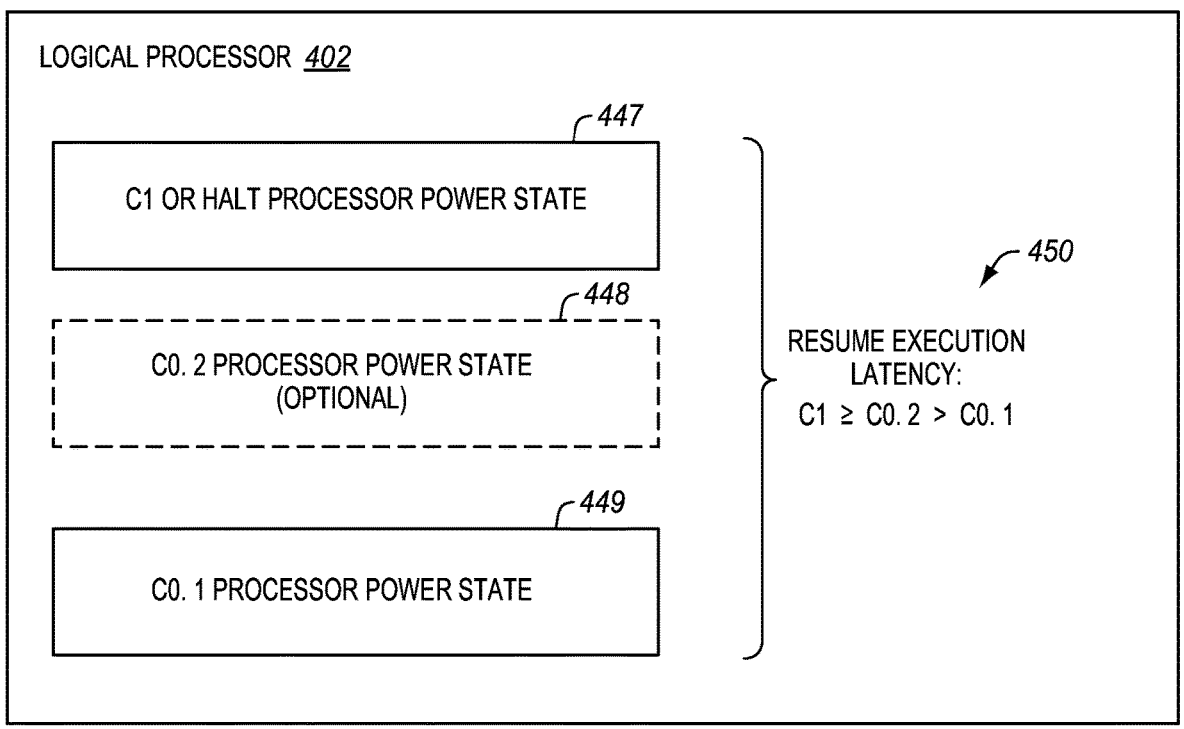
FIG. 4 is a block diagram of an example embodiment of a logical processor having a C1 processor power state, a C0.1 processor power state, and a C0.2 processor power state.

FIG. 4 is a block diagram of an example embodiment of a logical processor 402 having an example embodiment of a set of suitable alternate power states. The logical processor has or supports a C1 or halt processor power state 447. The logical processor may optionally have or support an optional C0.2 processor power state 448. The logical processor has or supports a C0.1 processor power state 449. As shown generally at reference 450, the resume execution latency of the C0.1 power state may be less than that of the C0.2 processor power state, and the resume execution latency of the C0.2 power state may be less than, similar to, or approximately equal to but not substantially greater than that of the C1 or halt processor power state.

Figure 5:
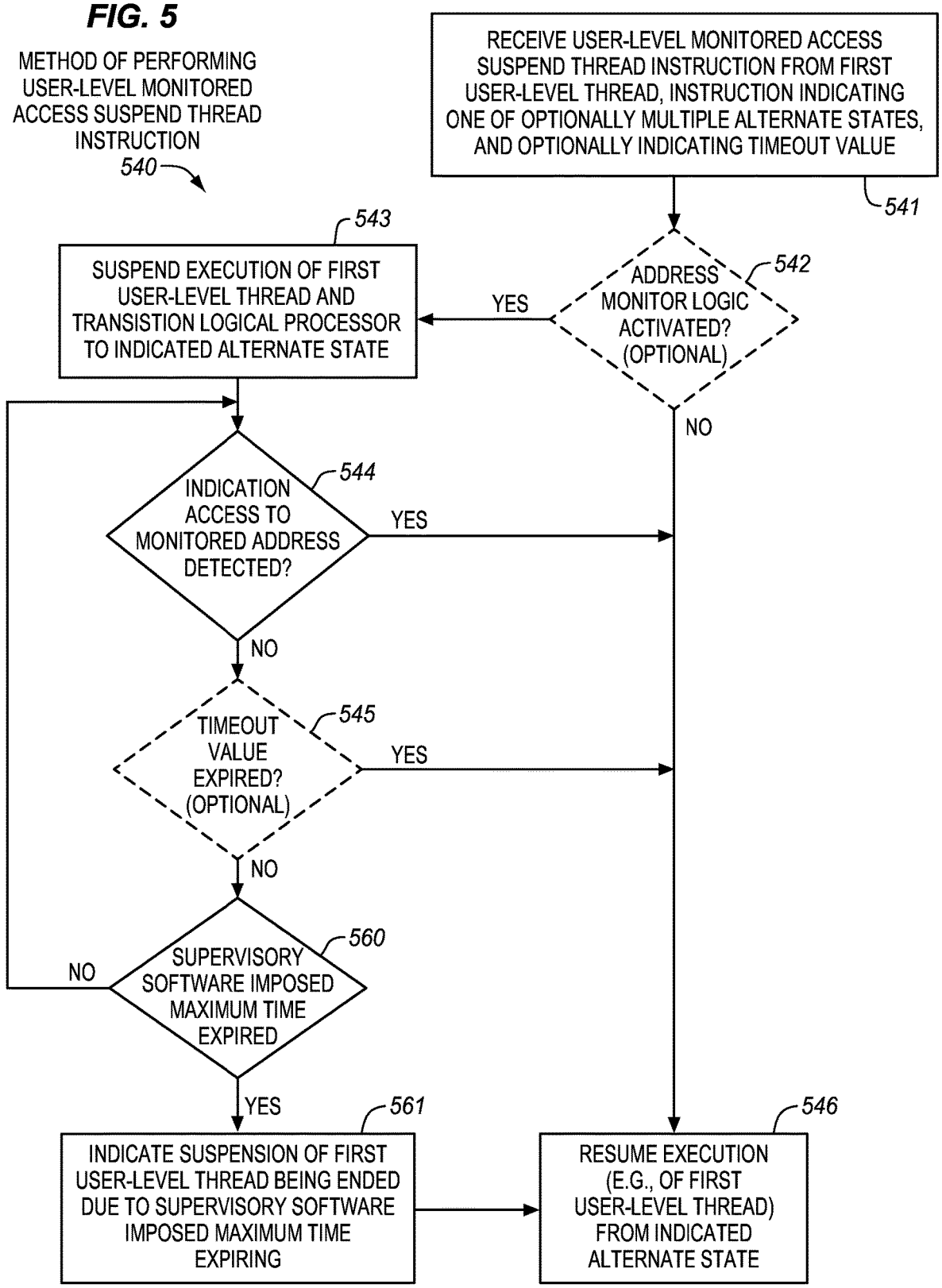
FIG. 5 is a block flow diagram of a second embodiment of a method of performing a user-level monitored access suspend thread instruction that includes using a supervisory system software imposed maximum timeout value.

FIG. 5 is a block flow diagram of a second embodiment of a method 540 of performing a user-level monitored access suspend thread instruction that includes using a supervisory system software imposed maximum timeout value. In various embodiments, the method may be performed by a processor, instruction processing apparatus, digital logic device, or integrated circuit. The method 540 has certain similarities to method 340 of FIG. 3. To avoid obscuring the description, the different and/or additional aspects for the method of FIG. 5 will primarily be described, without repeating all the optionally similar or common aspects and details relative to the method of FIG. 3. However, it is to be appreciated that the previously described aspects and details of the method of FIG. 3, as well as the variations mentioned therefor, may also optionally apply to the method of FIG. 5, unless stated or otherwise clearly apparent. Mainly, the method of FIG. 5 is different in that it further adds using a supervisory system software imposed maximum timeout value (e.g., as discussed in conjunction with block 560), and allows multiple alternate states to be optional. The method of FIG. 5 may be performed in combination with the previously described method 334 of performing the user-level set up monitor address instruction of FIG. 3, although the scope of the invention is not limited in this respect.

Referring to FIG. 5, the user-level monitored access suspend thread instruction may be received from a first user-level thread, at block 541. In some embodiments, the instruction may optionally specify or otherwise indicate a user-level timeout value (e.g., optionally as previously described in conjunction with FIG. 3). In some embodiments, the instruction may specify or otherwise indicate a given one of optionally multiple possible alternate states allowed for the instruction into which a logical processor is to be transitioned when the first user-level thread is suspended (e.g., optionally as previously described in conjunction with FIG. 3), although this is not required. If used, such multiple alternate states may optionally be similar to or the same as any of those previously described in conjunction with FIG. 3. However, it is optional (not required) that the processor or other apparatus in which the method is performed be operative to support such multiple alternative states in conjunction with performing the instruction. Further, it is optional (not required) that the instruction (e.g., an opcode thereof) be operative to support such multiple alternative states. In some embodiments, instead the processor and/or the instruction may optionally only indicate and support a single alternate state while the first thread is suspended (e.g., the single alternate state may optionally be implicit to the instruction (e.g., an opcode thereof). For example, a lighter nap state and/or a C0.1 state may optionally be implicit.

Referring again to FIG. 5, in some embodiments, the processor may optionally perform an initial determination whether the address monitor logic is activated, at block 542. For example, this may optionally be performed as previously described in conjunction with block 342 of FIG. 3. If the address monitor logic is activated (i.e., "yes" is the determination), the method may advance to block 543. Otherwise, if the address monitor logic is not activated (i.e., "no" is the determination), the method may advance to block 546.

At block 543, execution of the first user-level thread may be suspended and the logical processor on which the first user-level thread had been running may be transitioned into the indicated alternate state. As previously described, depending on the alternate state indicated different latencies may be needed to resume execution (e.g., due to changes made when transitioning to the indicated alternate state). For example, this may optionally be done as previously described in conjunction with block 343 of FIG. 3.

At blocks 544, 545, and 560, determinations may be made whether or not to resume execution (e.g., of the first user-level thread). Specifically, at block 544, a determination may be made whether there is an indication that an access to the monitored memory address has been detected. For example, this may optionally be done as previously described in conjunction with block 344 of FIG. 3. If there is an indication that an access to the monitored memory address has been detected (i.e., "yes" is the determination), the method may advance to block 546. Otherwise, if there is not an indication that an access to the monitored memory address has been detected (i.e., "no" is the determination), the method may advance to block 545.

At block 545, a determination may optionally be made whether the user-level timeout value indicated by the instruction has expired. For example, this may optionally be done as previously described in conjunction with block 345 of FIG. 3. If the timeout value has expired (i.e., "yes" is the determination), the method may advance to block 546. Otherwise, if the timeout value has not expired (i.e., "no" is the determination), the method may advance to block 560.

At block 560, a determination may be made whether a supervisory system software imposed and/or privileged-level maximum time or timeout value has expired. For simplicity, the supervisory system software imposed and/or privileged-level maximum time or timeout value may also be referred to herein simply as a supervisory system software imposed timeout value. The supervisory system software imposed timeout value may represent a limiting or maximum time or duration related value that the first user-level thread may be allowed to remain suspended in the event that an access to the monitored address has not been detected beforehand (e.g., at block 544) and/or the optional user-level timeout value has not expired (e.g., as determined at block 545). By way of example, imposing the supervisory system software imposed timeout value may help to prevent the first user-level thread from using processor resources for too long when the supervisor system software may want to use them for another purpose. In contrast to the user-level timeout value discussed in conjunction with block 545, the supervisory system software imposed timeout value may be provided by supervisory system software (e.g., an operating system module, virtual machine monitor module, or the like) and/or from a privileged-level of operation (e.g., at least higher than user-level privilege). Thus, in some embodiments, maximum timeout values may optionally be provided both from a user-level privilege or perspective, and from a privileged level or perspective.

The supervisory system software imposed timeout value may be expressed in various different ways, such as, for example, a value up to which a counter is to be incremented, a value down to which a counter is to be decremented, a value down from which a counter is to be decremented to zero, a value up to which a timer is to count, a value down to which a timer is to count, a value down from which a timer is to count to zero, a global clock or other clock time duration, a number of processor clock cycles, or the like.

In some embodiments, the supervisory system software imposed timeout value may be stored or provided in a register or other storage location by the supervisory system software and/or from a privileged-level of execution. For example, in some embodiments, the processor may have a model specific register (MSR), or other control register, that may be used to store the supervisory system software imposed timeout value. The MSR or other control register may optionally be implicit to the instruction (e.g., implicit to an opcode thereof) without needing to be explicitly specified. Alternatively, the supervisory system software imposed timeout value may optionally be configured differently.

If the supervisory system software imposed timeout value has not expired (i.e., "no" is the determination at block 560), the method may revisit block 544, where more determinations may be made optionally in a repeating loop until an exit condition from the loop is detected. Alternatively, if the supervisory system software imposed timeout value has expired (i.e., "yes" is the determination at block 560), the method may advance to block 561.

At block 561, an indication may be stored or otherwise provided that suspension of the first user-level thread is being ended due to expiration of the supervisory system software imposed timeout value. This may represent an indication or communication to the first user-level thread and/or its associated user-level application that the first user-level thread was resumed because the supervisory system software imposed timeout value expired and/or the supervisory-system software limited it, rather than for some other reason (e.g., the monitored memory access was detected, the optional user-level timeout value expired, an interrupt or other event was detected, etc.).

The indication at block 561 may be provided in different ways in different embodiments. For example, in various embodiments, this indication may be provided by setting or otherwise modifying one or more bits, setting or otherwise modifying one or more flags (e.g., one or more bits in an architectural flags or status register), storing a value in a register or memory location, or transmitting or asserting one or more signals. In one specific example embodiment, this indication may be provided by modifying a flag (e.g., setting a bit corresponding to a flag in register used to implement architectural flags), such as, for example, a zero flag, a carry flag, a new dedicated flag if desired, or some other flag.

The first user-level thread and/or its associated user-level application may be able to receive or observe such an indication that the first user-level thread suspension was ended due to the supervisory system software imposed timeout value. In some embodiments, this indication may optionally be used as a communication or notification between the supervisory system software and the user-level application that the supervisory system software has something better that it would like to do with the processor resources currently allocated to the first user-level thread and/or that the supervisory system software would like the first user-level thread to yield to it. Optionally, there may be an understanding, agreement, or contract that in the event of such an indication being provided the first user-level thread should transfer control to the supervisory system software, such as, for example, by yielding to an operating system module and entering itself into a wait queue associated with a sleep state. However, implementing such an understanding or agreement is optional not required.

At block 546, execution (e.g., of the first user-level thread) may be resumed from the indicated alternate state into which the logical processor had been transitioned. For example, this may optionally be done as previously described in conjunction with bock 346 of FIG. 3. In some embodiments, the latency with which the execution may be resumed may depend upon the particular indicated alternate state. For example, in some embodiments, execution may be resumed, from when the logical processor is in the indicated alternate state, with a latency that is to be less than half, less than one third, less than one fifth, less than one eight, even less, than a latency that execution of a thread can be resumed when the logical processor is in a C1 or halt processor power state of ACPI. In some embodiments, optionally one or more other alternate states may optionally be supported with resume execution latencies that are less than or at least not greater than, those of the C1 or halt processor power state of ACPI.

The method 540 has been shown and described in a relatively basic form, although operations may optionally be added to and/or removed from the method. For example, although for simplicity not shown, in some embodiments, the method 340 may optionally allow one or more other types of events to cause the first user-level thread to be resumed, although this is not required. For example, one or more additional determination blocks, similar to blocks 344 and 345, may optionally be added. In various embodiments, these determination blocks may determine whether or not a non-masked interrupt (NMI), a system management interrupt (SMI), a debug exception, a machine check exception, an initiation signal, a reset signal, certain types of external interrupt if they would be delivered to software, an event that changes address translation, or the like, has been detected, and if so cause the execution of the first user-level thread to resume. As another example, if desired, in some embodiments, the supervisory system software module and/or privileged level of execution may also optionally have other control, such as, for example, an ability to regulate or control or determine whether an alternate state is allowed to be entered while the first user-level thread is suspended. For example, in some embodiments, the supervisory system software and/or privileged level of execution may optionally be operative to allow entry into a relatively shorter resume execution latency but prevent entry into a relatively longer resume execution latency state. In addition, while the flow diagram illustration of the methods shows a particular order of operations, that order is just an example and is not required. Alternate embodiments may perform certain of the operations in different order, combine certain operations, overlap certain operations, etc. For example, the determinations at blocks 544, 545, and 560 may optionally be performed in a different order and/or concurrently, etc.

Figure 6:
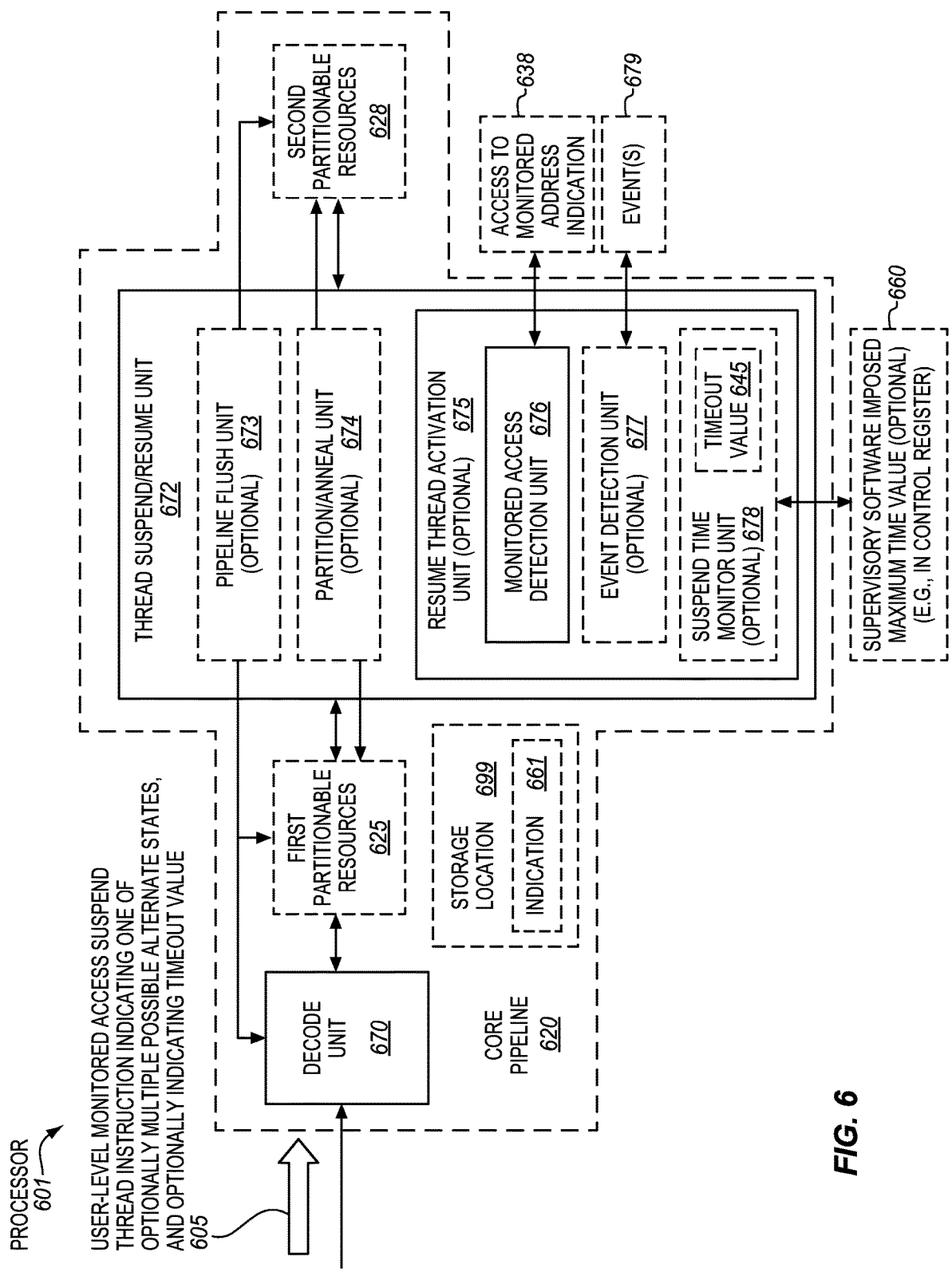
FIG. 6 is a block diagram of an embodiment of a processor that is operative to perform an embodiment of a user-level monitored access suspend thread instruction.

FIG. 6 is a block diagram of an embodiment of a processor 601 that is operative to perform an embodiment of a user-level monitored access suspend thread instruction 605. In some embodiments, the processor of FIG. 6 may be operative to perform the method of any one or more of FIGS. 3-5. The aspects and specific optional details described for the method of any of FIGS. 3-5, including for example the different possible alternate states and the described ways to transition logical processors to those alternate states and the associated resume execution latencies, as well as the supervisory system software imposed maximum timeout value and its described use, may also optionally apply to the method of FIG. 6. Alternatively, the processor of FIG. 6 may perform similar or different methods. Moreover, the methods of any one or more of FIGS. 3-5 may be performed by the same, similar, or a different processor than that of FIG. 6.

During operation, the processor may receive the user-level monitored access suspend thread instruction 605 from a first user-level software thread. The instruction may represent a macroinstruction, assembly language instruction, machine code instruction, or other instruction or control signal of an instruction set of the processor. In some embodiments, the instruction may optionally specify or otherwise indicate an optional user-level specified time or timeout value (e.g., as a source operand). For example, the time or timeout value may optionally be similar to, or the same as, the time or timeout value discussed in conjunction with block 345 of FIG. 3. In one aspect, the time or timeout value may represent a limiting or maximum value, as indicated by the user-level monitored access suspend thread instruction, for the first given thread to be in a suspended state, in the event that another resume thread event hasn't been detected beforehand. The various different ways previously discussed for expressing the user-level time or timeout value are suitable. By way of example, the user-level timeout value may optionally be stored in a specified or indicated register or provided by an immediate of the instruction.

In some embodiments, the user-level monitored access suspend thread instruction 605 may specify or otherwise indicate a given one of optionally multiple possible alternate states allowed for the instruction and into which a logical processor is to be transitioned when the first user-level thread is suspended, although this is not required. The various different ways previously discussed in which the instruction may indicate the alternate state, and the various previously described alternate states (e.g., without limitation the nap and lighter nap states), are suitable. Alternatively, only a single alternate state may optionally be supported by the instruction. For example, an opcode of the instruction may implicitly indicate a single supported alternate state such that there may be no need for additional information associated with the instruction to select between multiple such alternate states.

Referring again to FIG. 6, the processor includes a core pipeline 620. In some embodiments, the core pipeline is hardware multithreaded, such as, for example SMT. The core pipeline includes a decode unit or decoder 670. The decode unit may receive and decode the user-level monitored access suspend thread instruction 605. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level user-level monitored access suspend thread instruction. In some embodiments, the decode unit may include one or more input structures (e.g., port(s), interconnect(s), an interface) to receive the instruction, an instruction recognition and decode logic coupled therewith to recognize and decode the, and one or more output structures (e.g., port(s), interconnect (s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the user-level monitored access suspend thread instruction 605 being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the user-level monitored access suspend thread instruction 605, which may be of a first instruction set, and may emulate, translate, morph, interpret, or otherwise convert the user-level monitored access suspend thread instruction 605 into one or more corresponding intermediate instructions or control signals, which may be of a second different instruction set. The one or more intermediate instructions or control signals of the second instruction set may be provided to a decode unit (e.g., decode unit 670), which may decode them into one or more lower-level instructions or control signals executable by native hardware of the processor (e.g., one or more execution units).

Referring again to FIG. 6, a thread suspend/resume unit 671 is coupled with the decode unit 670. The thread suspend/resume unit may represent an execution unit to perform the instruction 605 and/or may also be referred to herein simply as an execution unit. As shown, the thread suspend/resume unit or execution unit may be coupled with the decode unit through other intervening components, such as, for example, a first set of optionally thread partitionable resources 625. The first set of optionally thread partitionable resources may optionally be similar to, or the same as, the thread partitionable resources 225. A second set of optionally thread partitionable resources 628 may be coupled with an output of the execution unit. This optional second set may optionally be similar to, or the same as, the thread partitionable resources 229. The thread suspend/resume unit may receive the one or more decoded or otherwise converted instructions or control signals that represent and/or are derived from the user-level monitored access suspend thread instruction 605. These control signals may potentially indicate or suggest an alternate state to enter (e.g., in some embodiments a nap state or a lighter nap state). The thread suspend/resume unit may also receive the optional user-level time or timeout value, if one is used in the particular implementation.

The thread suspend/resume unit may include specific or particular logic that is operative to perform the user-level monitored access suspend thread instruction 605. The thread suspend/resume unit and/or any of its illustrated or described components may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), or various combinations thereof, potentially/optionally in combination with some software (e.g., higher-level instructions stored in memory). In some embodiments, the thread suspend/resume unit and/or any of its illustrated or described components may optionally include only hardware and/or firmware without any software. The thread suspend/resume unit may be operative in response to and/or as a result of the user-level monitored access suspend thread instruction 605 (e.g., in response to one or more instructions or control signals decoded from the instruction) to suspend the first user-level software thread from which the instruction 605 was received. In some embodiments, before suspending the thread, the thread suspend/resume unit may optionally be operative, in response to the instruction, to determine whether address monitor logic is activated (e.g., optionally as previously described in conjunction with block 342 of FIG. 3) and/or ensure one or more other optional conditions are satisfied beforehand, although this is not required. For example, this may be done by the execution unit and/or the processor exchanging a signal or other communication with the address monitor logic.

The thread suspend/resume unit may also be operative in response to and/or as a result of the instruction 605 to transition the logical processor (e.g., an SMT hardware thread of the core pipeline 620) on which the thread was running to the indicated alternate state. In some embodiments, (e.g., in the case of a lighter nap state (e.g., a C0.1 state), or an optional even lighter nap state), in order to suspend the thread, the thread suspend/resume unit may transition to a lower latency resume execution state (e.g., mainly signal the core pipeline to stop executing instructions of the thread, and thereby allow shared resources to be used exclusively by one or more other threads sharing the same resources, without any fusing/combining of partitionable resources). In some embodiments, such an alternate state may optionally be the only state implemented for the instruction. In such cases, there may be no need for the thread suspend/resume unit to include an optional pipeline flush logic 673 or an optional partition/anneal unit 674.

Alternatively, in other embodiments, (e.g., in the case of one or more of a nap (e.g., a C0.2 state), a deeper nap, or a C1 or halt processor state optionally being supported), the thread suspend/resume unit may optionally transition the logical processor to a longer latency resume execution alternate state. For example, this may include signaling the core pipeline to stop executing instructions of the thread and allow shared resources to be used exclusively by one or more other threads sharing the same resources, and also reconfigure (e.g., fuse or combine) at least some partitionable resources (e.g., the first set of optionally thread partitionable resources 625 and/or the second set of optionally thread partitionable resources 628) for use by these one or more other threads. In such cases, the thread suspend/resume unit may include the optional pipeline flush logic 673 and the optional partition/anneal unit 674. The optional pipeline flush unit may be operative responsive to the instruction to flush or drain the core pipeline in order to clear all instructions. As shown, the optional pipeline flush unit may be operative to signal other components of the pipeline.

Once the pipeline has been flushed or drained, the optional partition/anneal unit may be operative to fuse, anneal, or otherwise combine at least some partitionable resources (e.g., the first set 625 and/or the second set 628), which were previously dedicated to the first user-level thread, so that the one or more other threads may use these resources while the first user-level thread is suspended. As shown, the optional partition/anneal unit may be operative to signal the first and/or second sets of optionally thread partitionable resources. By way of example, this may include first draining instructions from queues, a store buffer, a reorder buffer, and the like, and then combining entries of the queues, store buffer, and reorder buffer for use by one or more other threads besides the first user-level thread.

Once the first user-level thread has been suspended, a resume thread activation unit 675 may be operative, in response to the instruction, to monitor or detect one or more types of events or conditions (e.g., as desired for the particular implementation) which are to trigger or cause resumption of the first user-level thread. As shown, the resume thread activation unit may include a monitored access detection unit 676. The monitored access detection unit may be operative to watch for and/or observe and/or detect an indication 638 of an access to the monitored address. By way of example, the access to the monitored address indication may be provided in the various ways previously described in conjunction with block 338 of FIG. 3. If such an indication is detected, the monitored access detection unit and/or the resume thread activation unit may initiate resumption of the first user-level thread.

The resume thread activation unit may optionally include an event detection unit 677. The optional event detection unit may be operative to watch for and/or observe and/or detect one or more other different types of events 679 that may cause resumption of the first user-level thread. Whether or not any such events may trigger resumption of the first user-level thread is optional for the particular implementation. In some embodiments, possible examples of events that may optionally trigger resumption of the first user-level thread include one or more of a non-masked interrupt (NMI), a system management interrupt (SMI), a debug exception, a machine check exception, an initiation signal, a reset signal, certain types of external interrupt if they would be delivered to software, events that change address translation, or various combinations thereof. If such an event detected, the event detection unit and/or the resume thread activation unit may initiate resumption of the first user-level thread.

The resume thread activation unit may optionally include a suspend time monitor unit 678. The optional suspend time monitor unit may be operative to monitor a time that the first user-level thread has been suspended relative to one or more of an optional user-level time or timeout value 645 and an optional supervisory system software imposed time or timeout value 660. The user-level time or timeout value 645 may optionally have been indicated by the instruction, as discussed above. The optional supervisory system software imposed time or timeout value may be similar to that previously described in conjunction with block 560 of FIG. 5 and may optionally be used in a similar way. By way of example, this supervisory system software imposed time or timeout value 660 may optionally be stored in a control register (e.g., a model specific register) of the processor. If the supervisory system software imposed time or timeout value 660 is determined to have expired, an indication 661 of such may optionally be stored in a storage location 699. For example, this may be performed as described at block 561 of FIG. 5. If any of the optionally implemented times or timeout values is determined to be expired, the suspend time monitor unit and/or the resume thread activation unit may initiate resumption of the first user-level thread.

Upon detection of any of the aforementioned thread resumption conditions, or others desired for the particular implementation, the thread suspend/resume unit 672, responsive to the instruction, may be operative to resume the first user-level thread. If previously partitioned and relinquished partitionable resources are to be repartitioned, the optional pipeline flush unit 672 may be operative responsive to flush or drain the core pipeline in order to clear all instructions. Once the pipeline has been flushed or drained, the optional partition/anneal unit 674 may be operative to re-partition these partitionable resources (e.g., any of the first set 625 and/or the second set 628 which were previously annealed), so that the soon-to-be-awakened first user-level thread may again be able to utilize those resources. The first user-level thread may then be resumed and further execution of instructions from the first user-level thread may begin.

To avoid obscuring the description, a relatively simple processor has been shown and described. However, the processor may optionally include other processor components. For example, various different embodiments may include various different combinations and configurations of the components shown and described for any of FIGS. 9A/B, 10A/B, and 11. All of the components of the processor may be coupled together to allow them to operate as intended.

Figure 7:
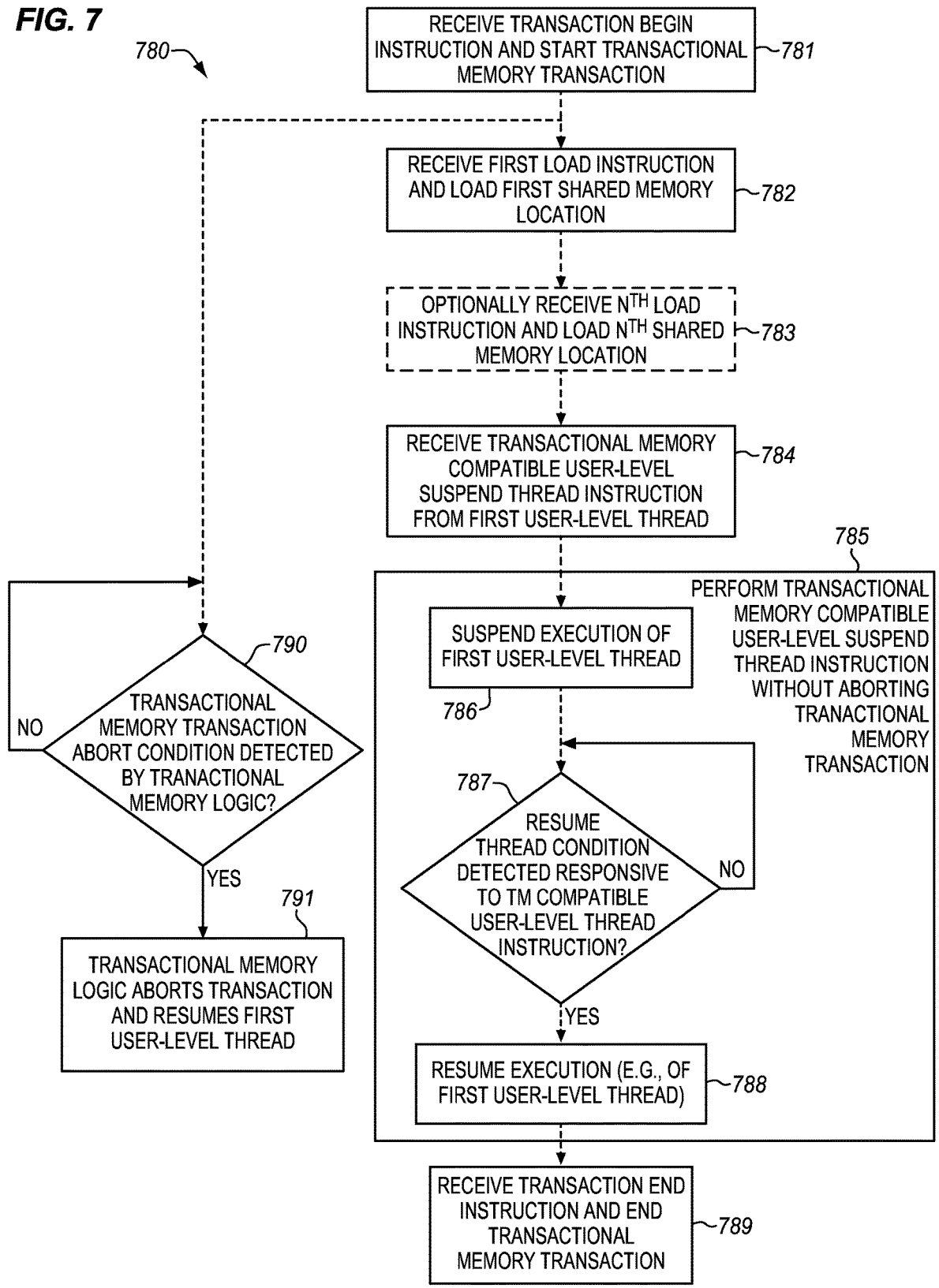
FIG. 7 is a block flow diagram of an example embodiment of a method of performing a transactional memory compatible user-level suspend thread instruction within a transactional memory transaction to suspend a first user-level thread without aborting the transactional memory transaction.

FIG. 7 is a block flow diagram of an example embodiment of a method 780 of performing a transactional memory compatible user-level suspend thread instruction within a transactional memory transaction to suspend a first user-level thread without aborting the transactional memory transaction. In some embodiments, the method may allow the first user-level thread to be resumed either responsive to the transactional memory compatible user-level suspend thread instruction or due to an abort of the transactional memory transaction by transactional memory logic of the processor. In various embodiments, the method may be performed by a processor, instruction processing apparatus, digital logic device, or integrated circuit. In some embodiments, the method of FIG. 7 may be performed by and/or within the processor of FIG. 6, which may additionally optionally include transactional memory logic to support transactional memory. The components, features, and specific optional details described herein for the processor of FIG. 6, also optionally apply to the method of FIG. 7. Alternatively, the method of FIG. 7 may be performed by and/or within a similar or different processor or apparatus (e.g., one optionally omitting the monitor access detection unit 676 and/or optionally omitting logic to monitor detection of accesses to memory addresses). Moreover, the processor of FIG. 6 may perform methods the same as, similar to, or different than those of FIG. 7.

Transactional memory is also sometimes referred to as transactional execution. Transactional memory represents an approach to control concurrent accesses to shared data by different entities (e.g., logical processors), which may help to reduce the need to use locks. One suitable example of transactional memory, for some embodiments, is Restricted Transactional Memory (RTM) form of transactional memory of Intel® Transactional Synchronization Extensions (Intel® TSX) forms of transactional memory), although the scope of the invention is not so limited. The transactional memory as described herein may in some embodiments have any one or more, or optionally substantially all, of the features of RTM form of transactional memory, although the scope of the invention is not so limited. Other forms of transactional memory are also suitable.

The processor, integrated circuit, or other apparatus in which the method is performed may have transactional memory logic. Hardware, firmware, combinations thereof, and combinations with hardware and/or firmware with software may be used to implement different forms of transactional memory such as purely hardware transactional memory (HTM), unbounded transactional memory (UTM), and hardware supported (e.g., accelerated) software transactional memory (STM) (hardware supported STM). By way of example, the processor may have a transaction buffer or other storage, transaction begin logic to begin a transaction, transaction conflict detection logic to detect transaction abort conditions, transaction abort logic to abort a transaction, transaction end logic to end a transaction, and the like.

Referring to FIG. 7, the method includes receiving a transaction begin instruction, and beginning a transactional memory transaction, at block 781. One specific example of a suitable transaction begin instruction is the XBEGIN instruction in the RTM form of transactional memory, although the scope of the invention is not so limited. The XBEGIN instruction when performed may be operative to cause the processor to transition the execution to transactional memory (e.g., turn on transactional memory), if it has not already transitioned to transactional memory. The XBEGIN instruction may also indicate an instruction address of a handler that is to handle an aborted transaction if one occurs. In other embodiments, the transaction begin instruction may not be the specific XBEGIN instruction, but rather may have any one or more, or optionally all, of the features of the XBEGIN instruction, or similar features, potentially combined with additional features. The scope of the invention is not limited to any known transaction begin instruction or its operations.

A group of instructions and/or operations within the transaction may be transparently performed atomically through the utilization of transactional memory. The atomicity implies in part that these instructions and/or operations are either performed fully, or not at all, but is not divisibly. Within the transaction, data that would otherwise be protected by a lock may only be read, but not written non-speculatively within the transaction in a way that would be globally visible, and there may be no need to actually acquire the lock. If the transactional memory transaction is successful, then writes to the data by instructions and/or operations within the transaction may be performed atomically, without locks needing to have been acquired. However, if the transactional memory transaction is not successful and/or is aborted, the speculative updates to state may be discarded without ever having been visible to other logical processors. In addition, data reads within the transaction may also occurs atomically without the need to acquire locks. These reads may represent the read-set of the transaction memory transaction. If, while within the transactional memory transaction, the transactional memory logic detects that any of the memory-addresses that have been read within the transaction (e.g., the transaction read-set) have been modified by another logical-processor, the transaction may abort, since the entire read-set was not able to be acquired atomically. As will be explained further below, this aspect of transactional-memory may be leveraged to monitor multiple memory-addresses in unison and in combination with a suspend thread instruction which does necessarily have to have an associated memory address that is monitored (e.g., instead this can be offloaded to monitoring via transactional memory).

Referring again to FIG. 7, once the transactional memory transaction has been begun (e.g., by performing the transaction begin instruction at block 781), the transactional memory logic (e.g., including predominantly on-die logic (e.g., hardware and/or firmware) of the processor) may begin to monitor and determine whether a transactional memory transaction abort condition is detected, at block 790. Note that the "fork" at the output of block 781 does not represent alternate paths, but rather parallel paths that may occur together and concurrently, as will be discussed further below. Different types of abort conditions may potentially be supported as desired for the particular implementation. In some embodiments, a conflicting access (e.g., a write to the transaction read-set) may represent one such transaction abort condition. If no such abort condition is detected (i.e., "no" is the determination at block 790), the method may repeatedly cycle back through again making such a determination at block 790. In one aspect, the processor and/or its transactional memory logic may substantially continually monitor for such abort conditions for as long as the transactional memory transaction is being performed. If such an abort condition is detected, (i.e., "yes" is the determination at block 790), the method may advance to block 791, where the transactional memory logic may abort the transaction, as will be discussed further below.

Referring again to FIG. 7, after the transaction begin instruction has been performed, and while the transactional memory logic monitors for abort conditions at block 790, additional instructions of the transaction may be performed. In some embodiments, one or more load instructions may be performed within the transaction to load data from shared memory locations. Load instructions are also sometimes referred to as read instructions or move instructions. As shown at block 782, a first load instruction may be received and performed within the transactional memory transaction, and a first shared memory location or memory address may be loaded. Optionally, other load instructions may similarly be performed to read other shared memory locations or addresses. As shown at block 783, optionally up through an Nth load instruction may be received and performed within the transactional memory transaction, and an Nth corresponding shared memory location or memory address may be loaded. By way of example, in some embodiments, the number of memory locations read may range from one (or two) to on the order of fifty, or from one (or two) to on the order of twenty, although the scope of the invention is not so limited to any known number. These one or more loads performed within the transaction may represent the so-called read set of the transaction.

Referring again to FIG. 7, a transactional memory compatible user-level suspend thread instruction may be received within the transactional memory transaction, at block 784. The instruction may be received from a first user-level thread, from which the instructions of blocks 781-783 have also been received. At block 785, a method may be performed responsive to the transactional memory compatible user-level suspend thread instruction without aborting the transactional memory transaction. Advantageously, the transactional memory compatible user-level suspend thread instruction may be allowed to be performed within a transactional memory transaction without the transactional memory transaction needing to be ended or aborted and/or without needing to transfer to a supervisor software handler. By contrast, certain other types of suspend thread instructions and/or power management instructions may not be compatible with transactional memory, and if performed within a transactional memory transaction, may cause the transactional memory transaction to be aborted.

As shown at block 786, execution of the first user-level thread may be suspended in response to the transactional memory compatible user-level suspend thread instruction. Then, at block 787, a determination may be made whether a resume thread condition has been detected responsive to the transactional memory compatible user-level suspend thread instruction. Notice that the determination at block 787 may take place concurrently and in parallel with the determination at block 790. In other words, block 787 may take place substantially continuously responsive to the transactional memory compatible user-level suspend thread instruction once it has been performed and until it completes, and the determination at block 790 may be performed substantially continuously once transactional execution has begun and may continue until transactional execution aborts or ends. At block 787, if no such resume thread condition has been detected (i.e., "no" is the determination at block 787), the method may continue checking. Otherwise, if a resume thread condition has been detected (i.e., "yes" is the determination at block 787), the method may advance to block 788. At block 788, the first user-level thread may be resumed response to the transactional memory compatible user-level suspend thread instruction. For example, the thread may resume at a next instruction following the transactional memory compatible user-level suspend thread instruction. If desired, the method and/or software may then recognize that the monitored locations have not been modified and may optionally perform another instance of a transactional memory compatible user-level suspend thread instruction to suspend the thread again while the locations are monitored further by the transactional memory logic. Alternatively, the method may then advance to block 789, where a transaction end instruction (e.g., as one example an XEND instruction) may be received, and the transactional memory transaction responsively committed.

The operations of block 785 have been shown and described in a relatively basic form, although operations may optionally be added thereto. For example, in some embodiments, the operations at block 785 may include any one or more of the operations of blocks 342-346 of FIG. 3, including the variations and alternatives thereof. In other embodiments, the operations at block 785 may include any one or more of the operations of blocks 542-546 and/or 560-561 of FIG. 5, including the variations and alternatives thereof. In still other embodiments, the operations at block 785 may include any one or more of the operations of blocks 894-899 of FIG. 8 (which will be discussed further below) including the variations and alternatives thereof. That is, in some embodiments, the previously described alternate states discussed in conjunction with FIG. 3 may optionally be used with the transactional memory compatible user-level suspend thread instruction. Also, in some embodiments, the previously described supervisory software imposed maximum timeout value discussed in conjunction with block 560 and the indication of block 561 of FIG. 5 may optionally be used with the transactional memory compatible user-level suspend thread instruction. In some embodiments, block 785 may optionally include determining whether an indication of an access to a monitored address has been detected (e.g. at described for block 344 or 544). In other embodiments, block 785 may optionally omit making such a determination. That is, in some embodiments, there may be no associated memory address monitoring operation as part of this instruction.

Now, even after the execution of the first user-level thread is resumed at block 788, the determination at block 790 may still take place. That is, the determination at block 790 may take place before, while, and after the performance of the transactional memory compatible user-level suspend thread instruction, as long as the transactional memory transaction is being performed. Such determination at block 790 may be separate from and not controlled by the transactional memory compatible user-level suspend thread instruction but rather more a part of transactional memory. In part, the determination at block 790 may determine whether there are any conflicting accesses to the memory locations or addresses corresponding to the load instruction(s) at blocks 782-783. These may represent the read set of the transactional memory transaction. In some embodiments, a detected write, or detected attempted write, by another logical processor to any of these shared memory locations of the read set of the transactional memory transaction may represent such a conflicting access that may cause the transactional memory transaction to be aborted.

If an abort condition is detected (i.e., "yes" is the determination at block 790), for example if a write is detected to any of the memory addresses associated with the load instructions of blocks 782-783, or if an interrupt or certain other microarchitectural conditions occur, the method may advance to block 791. At block 791, the transactional memory logic may cause the transactional memory transaction to be aborted. Any speculative updates to architectural state (e.g., the loads of blocks 782-783) may be undone. Optionally, information may be provided about a reason for the abort (e.g., in a general-purpose register). In some embodiments, this may also end the performance of the transactional memory compatible user-level suspend thread instruction and resume the suspended first user-level thread. Note that under such conditions aborting the transactional memory transaction, and resuming the first user-level thread, may be performed separately by the transactional memory logic, rather in response to performing the transactional memory compatible user-level suspend thread instruction (e.g., not part of block 785). Control may also generally transfer to an abort handler (e.g., at the instruction address indicated by the transaction begin instruction of bock 781). In some embodiments, the handler may expect that one of the monitored locations (e.g., corresponding to blocks 782-783) have been modified and may investigate this.

The load instruction(s) of block 782 and optionally block 783 of the transactional memory transaction may effectively set up or configure the transactional memory logic with the memory addresses and/or ranges to monitor. At least conceptually, when used in this way, the transactional memory logic may serve as a sort of address monitor logic that may be leveraged so that a separate address monitor logic (e.g., set up by a user-level set up monitor address instruction) doesn't need to be used. In addition, in some embodiments, the transactional memory logic may optionally/potentially monitor one memory address or range, or optionally/potentially two or more memory addresses or ranges, or optionally/potentially from several to a large number of memory addresses or ranges. Representatively, if an access is made to the read set associated with any one of these one or multiple memory addresses or ranges, the transactional memory logic may abort the transaction and cause execution to be resumed. Moreover, while the transactional memory logic monitors for such writes to the read-set, one or more of the transactional memory compatible user-level suspend thread instructions may be performed to suspend the first user-level thread.

There are various different possible reasons for wanting to monitor multiple memory addresses. The scope of the invention is not limited to any known such reason. However, to further illustrate certain concepts, one specific example will be described. In this example, software may interact with a network interface card that may be supporting multiple incoming queues of messages arriving on different links.

The network interface card may write a different location in memory to indicate receipt of a message into each of the multiple corresponding incoming queues. A given software thread may want to suspend when there are no messages in the incoming queues, but may desire to be resumed when a message is available in one of the incoming queues. This is just one example. In other examples, memory addresses may be monitored for other types of input-output data, or for various other reasons.

In other embodiments, a user-level suspend thread instruction, similar to that described for the transactional memory compatible user-level suspend thread instruction of blocks 784-785 of FIG. 7, need not necessarily be used within a transactional memory transaction and need not necessarily be compatible with transactional memory. That is, it is optional that such an instruction is used in a transactional memory transaction. Moreover, it is optional that such an instruction is transactional memory compatible. Rather, for example, such an instruction may be used to suspend a user-level thread while waiting for one or more timeout values to expire (e.g., a user-level timeout value and/or a supervisory software imposed timeout value) and/or while waiting for an interrupt and/or other resume thread event desired for the particular implementation.

Figure 8:
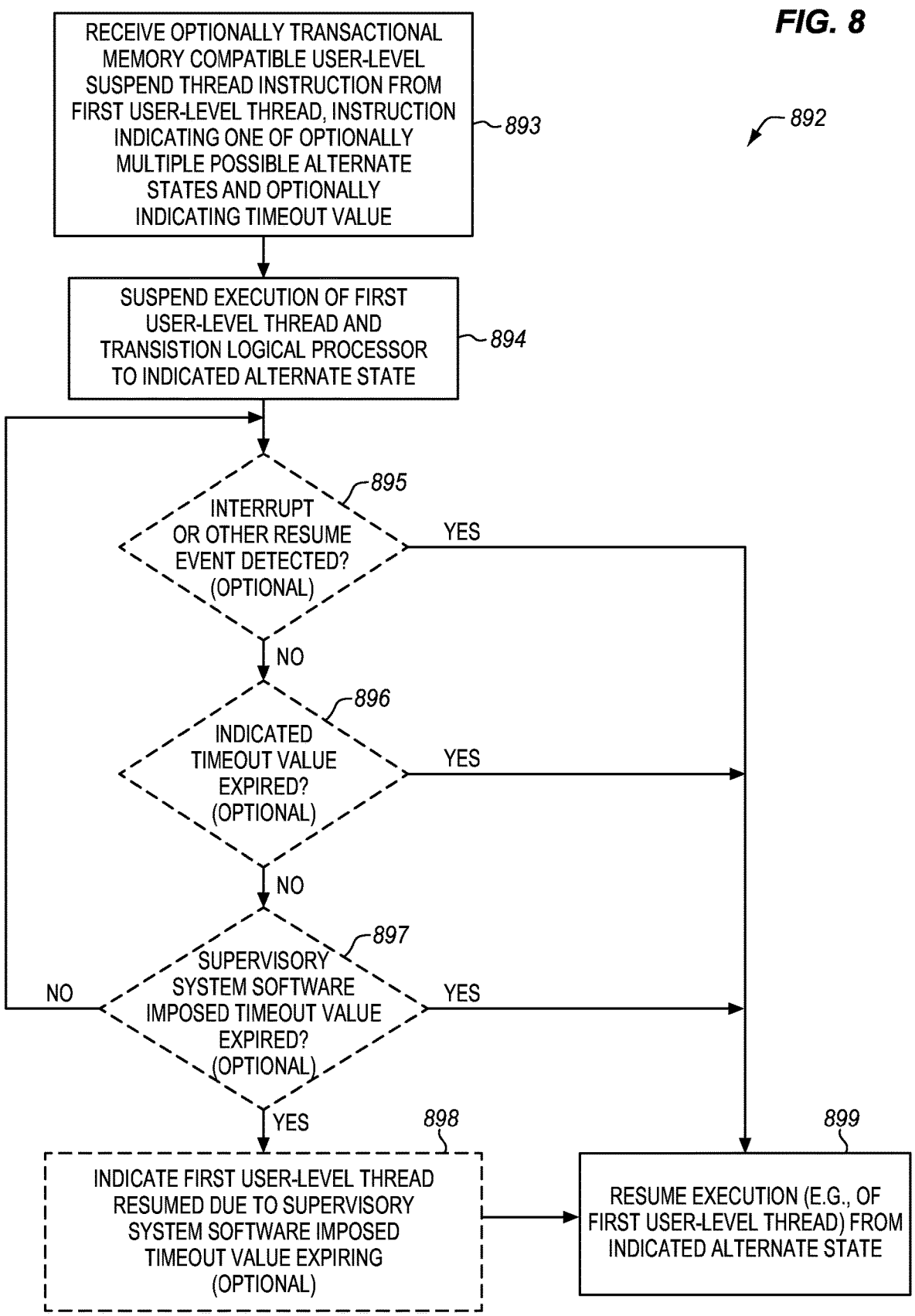
FIG. 8 is a block flow diagram of a second embodiment of a method of performing a transactional memory compatible user-level suspend thread instruction.

FIG. 8 is a block flow diagram of an embodiment of a method 892 of performing an optionally transactional memory compatible user-level suspend thread instruction. In various embodiments, the method may be performed by a processor, instruction processing apparatus, digital logic device, or integrated circuit. In some embodiments, the method may be performed by the processor of FIG. 6. The components, features, and specific optional details described herein for the processor of FIG. 6, also optionally apply to the method of FIG. 8. Alternatively, the method of FIG. 8 may be performed by and/or within a similar or different processor or apparatus (e.g., one optionally omitting the monitor access detection unit 676 and/or optionally omitting any logic to observe detection of accesses to any memory addresses). Moreover, the processor of FIG. 6 may perform methods the same as, similar to, or different than those of FIG. 8.

Referring to FIG. 8, the optionally transactional memory compatible user-level suspend thread instruction may be received, at block 893. In some embodiments this instruction may optionally be compatible with transactional memory. In other embodiments this is not required. In some embodiments, the instruction may optionally specify or otherwise indicate a user-level timeout value. For example, this may optionally be as previously described in conjunction with block 341 of FIG. 3, including the variations and alternatives thereof. In some embodiments, the instruction may specify or otherwise indicate one of optionally multiple possible alternate states. For example, this may optionally be as previously described in conjunction with block 341 of FIG. 3, including the variations and alternatives thereof. By way of example, this may include the previously described lighter nap state and the nap state.

At block 894, execution of the first user-level thread may be suspended and the logical processor on which the first user-level thread had been running may be transitioned to the indicated alternate state. For example, this may optionally be done as previously described in conjunction with block 343 of FIG. 3, including the variations and alternatives thereof, and including using any of the previously described alternate states (e.g., lighter nap, nap, C0.1, C0.2, etc.).

At blocks 895-897, determinations may optionally be made whether or not to resume execution (e.g., of the first user-level thread). Specifically, at block 895, a determination may optionally be made whether an interrupt or other thread resume event has been detected. For example, in various embodiments, a non-masked interrupt (NMI), a system management interrupt (SMI), a debug exception, a machine check exception, an initiation signal, a reset signal, certain types of external interrupt if they would be delivered to software, events that change address translation, and various combinations thereof, may optionally cause the first user-level thread to be resumed. Many of such events are typically handled by privileged software and so resuming execution due to such events may involve transitioning execution to an appropriate privileged-level handler. In other embodiments, certain types of interrupts (e.g., input-output interrupts, interrupts from an on-die hardware accelerator, other interrupts appropriate for user-level code) may optionally be provided directly to a user-level application and handled by the user-level application without a need to transition out of user-level privilege to a higher privilege level, although this is not required. In such events, execution may resume potentially either with the same user-level thread or a different user-level thread. If a resume event of one of these types has been detected (i.e., "yes" is the determination at block 895), the method may advance to block 899. Otherwise, if no resume event has been detected (i.e., "no" is the determination), the method may advance to block 896.

At block 896, a determination may optionally be made whether the optional user-level timeout value optionally indicated by the transactional memory compatible user-level suspend thread instruction has expired. For example, this may optionally be done as previously described in conjunction with block 345 of FIG. 3, including the variations and alternatives therefor. If the user-level timeout value has expired (i.e., "yes" is the determination), the method may advance to block 899. Otherwise, if the user-level timeout value has not expired (i.e., "no" is the determination), the method may advance to block 897.

At block 897, a determination may optionally be made whether an optional supervisory system software imposed timeout value has expired. For example, this may optionally be done as previously described in conjunction with block 560 of FIG. 5, including the variations and alternatives therefor. If the supervisory system software imposed timeout value has not expired (i.e., "no" is the determination), the method may revisit block 895, where another rounder of determinations may be made, optionally in a continuous loop until an exit condition from the loop is detected. Alternatively, if the timeout value has expired (i.e., "yes" is the determination), the method may advance to block 898.

At block 898, an indication may be provided that suspension of the first user-level thread is being ended due to expiration of the supervisory system software imposed and/or privileged-level maximum time or timeout value. For example, this may optionally be done as previously described in conjunction with block 561 of FIG. 5, including the variations and alternatives therefor.

At block 899, execution of the first user-level thread may be resumed from the logical processor in the indicated alternate state. For example, this may optionally be done as previously described in conjunction with block 346 of FIG. 3 and/or block 546 of FIG. 5, including the variations and alternatives therefor.

Notice that in FIG. 8, in some embodiments, the optionally transactionally memory compatible user-level suspend thread instruction may optionally omit a need to monitor for indications of accesses to a memory location (e.g., like that previously described for block 344 of FIG. 3). Rather, in some embodiments, there is no need for the instruction to have any associated monitored address or any such address monitoring. Rather, as one example, transactional memory logic may optionally be used to monitor accesses to one or more addresses (e.g., as discussed for FIG. 7), although this is not required. Further, as another example, a thread may be suspended not waiting on a memory access to occur, but rather waiting merely on one or more timeout values, waiting on an interrupt to occur (e.g., optionally a user-level interrupt that may be delivered directly to user-level code), or a combination but without a monitored memory address.

The method 892 has been shown and described in a relatively basic form, although operations may optionally be added to and/or removed from the method. For example, any one or more of the optional determinations at blocks 895-897 may optionally be removed. In addition, while the flow diagram illustration of the methods shows a particular order of operations, that order is just an example and is not required. Alternate embodiments may perform certain of the operations in different order, combine certain operations, overlap certain operations, etc. For example, the determinations at blocks 895-897 may optionally be performed in a different order and/or concurrently, etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
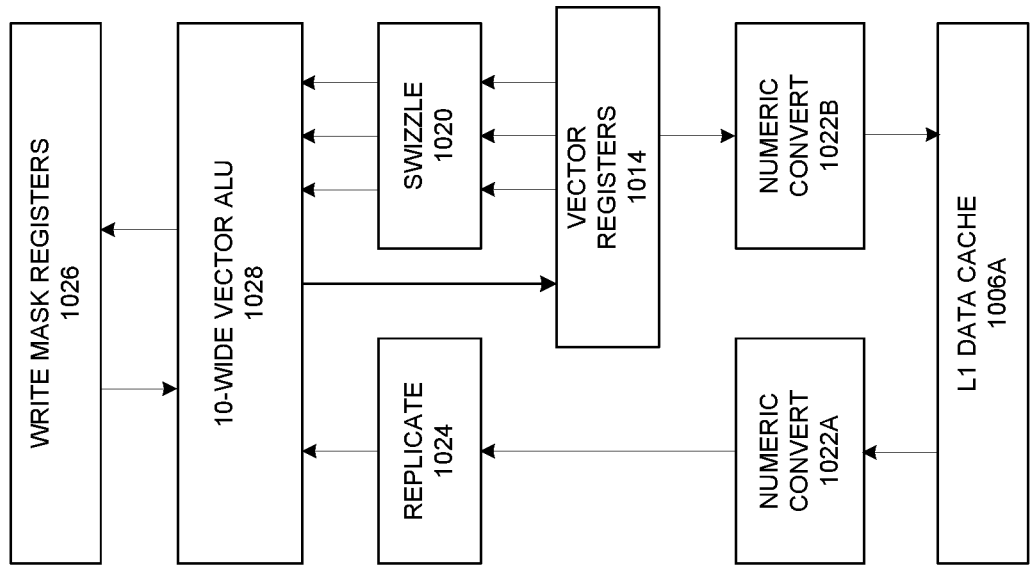
FIG. 10B is a block diagram of an embodiment of an expanded view of part of the processor core of FIG. 10A.
Figure 10A:
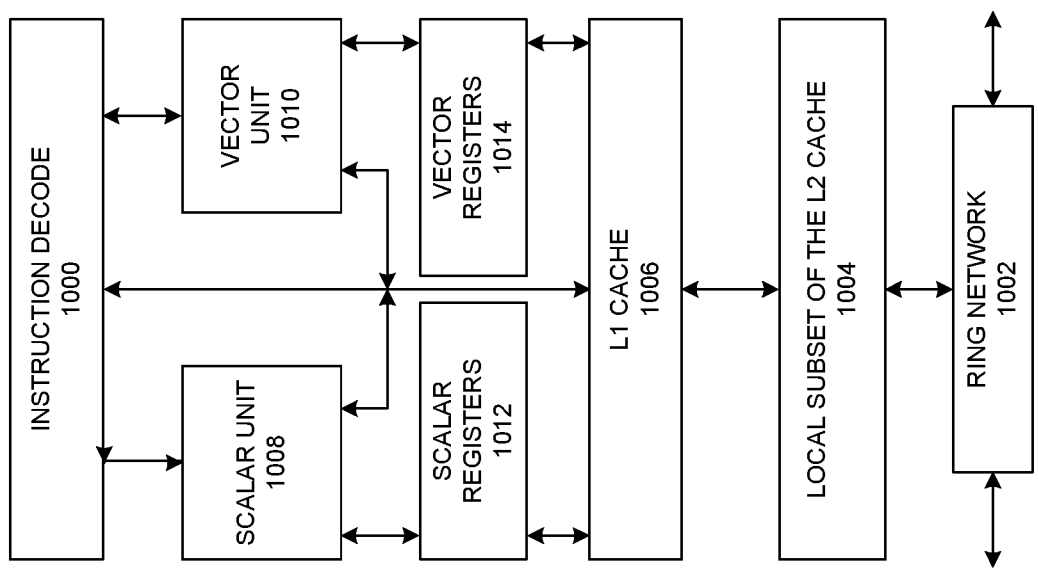
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
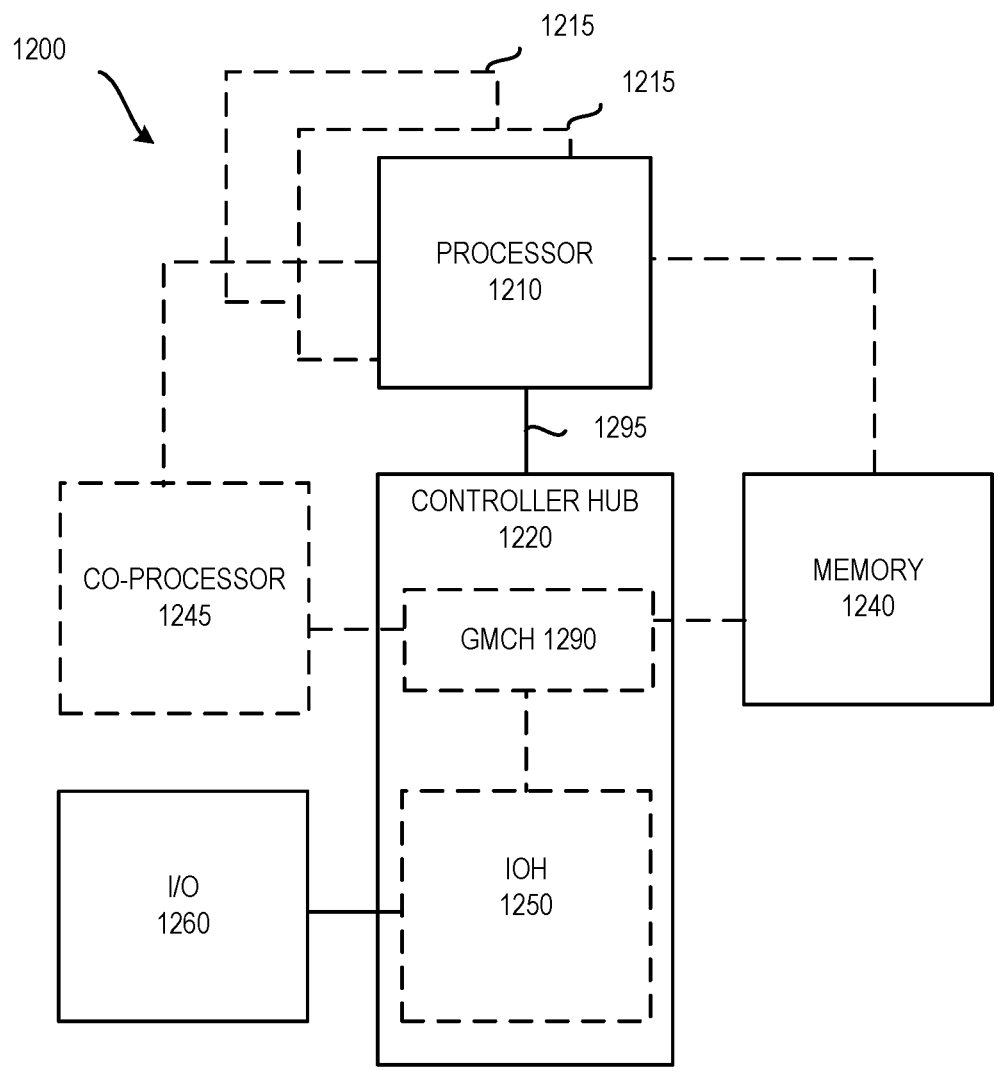
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
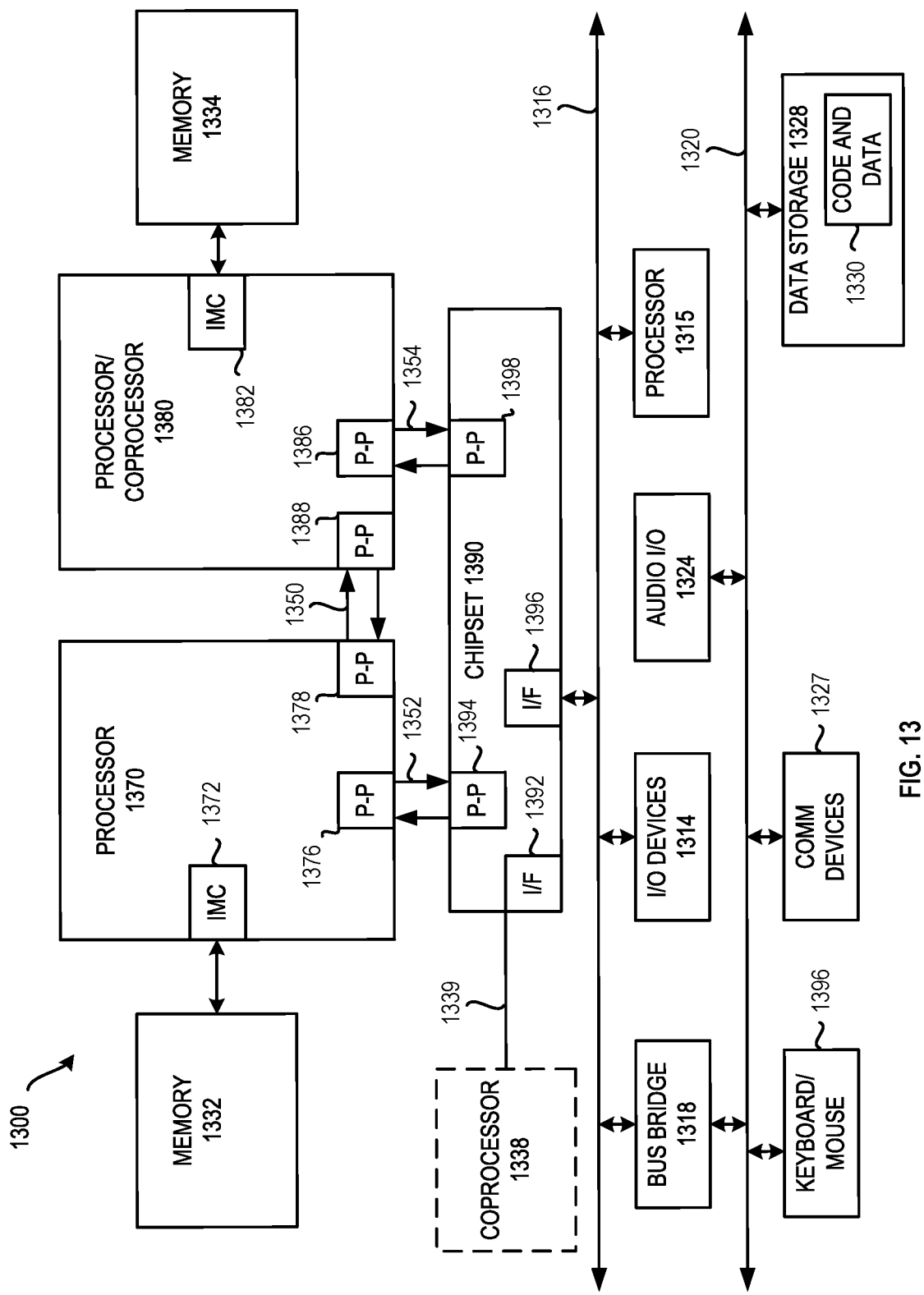
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
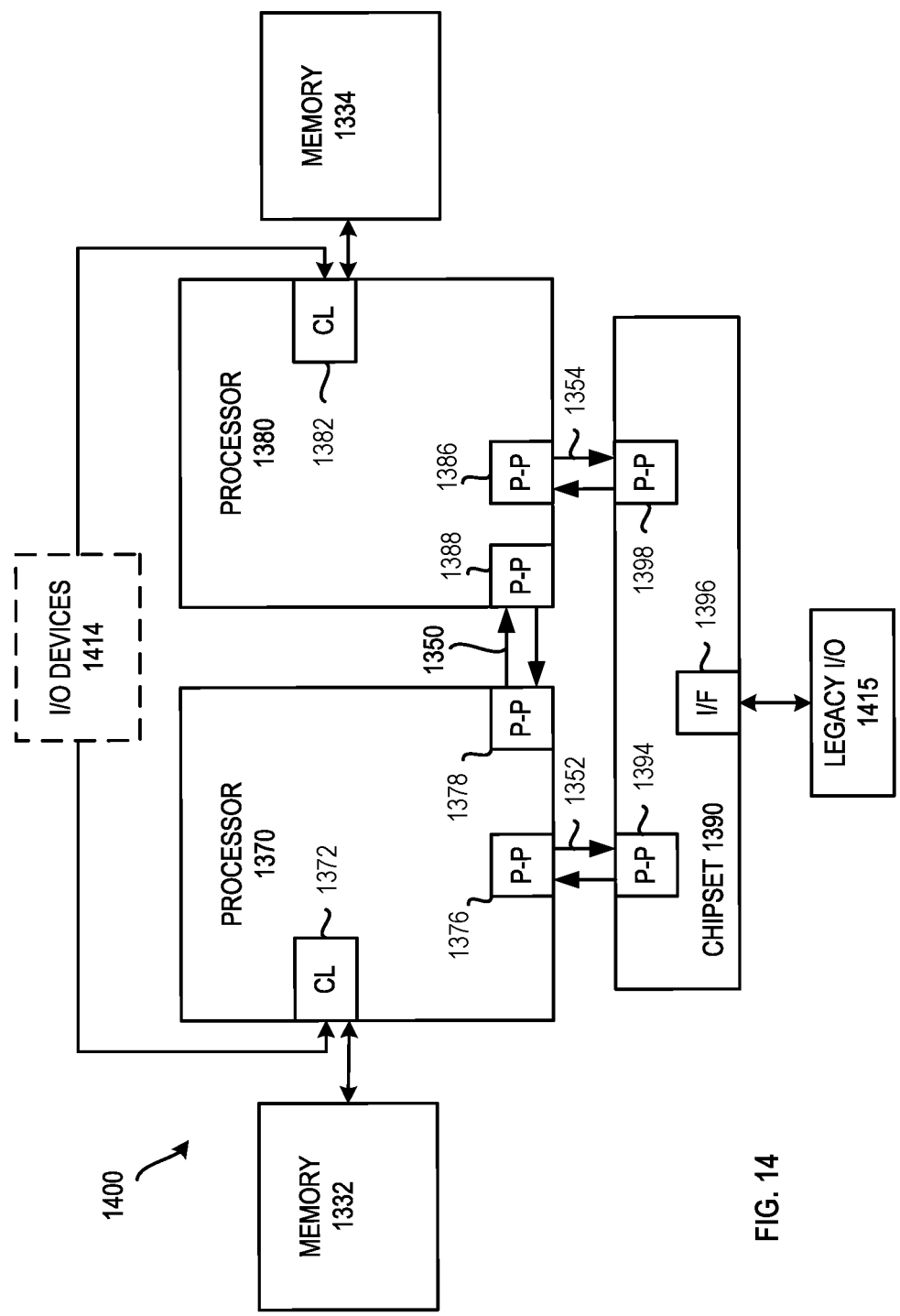
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
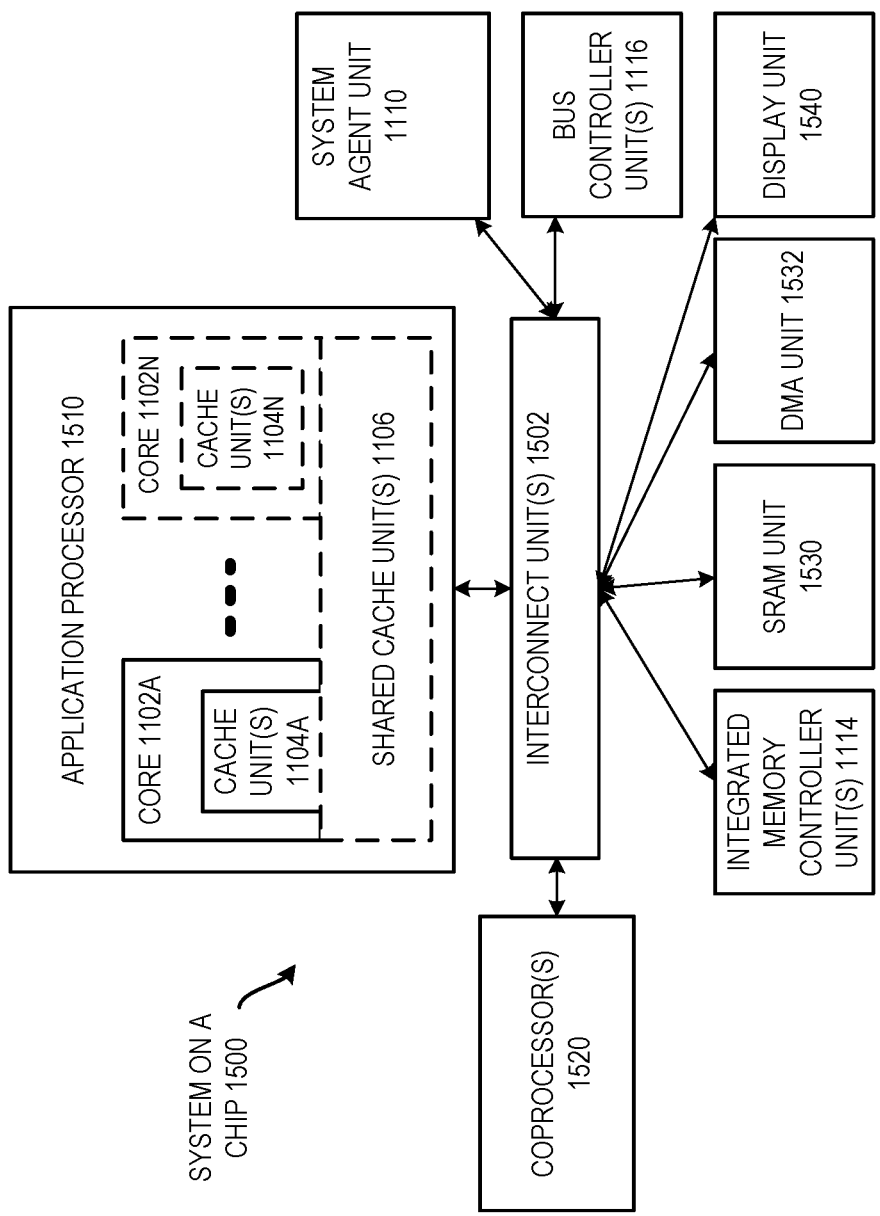
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
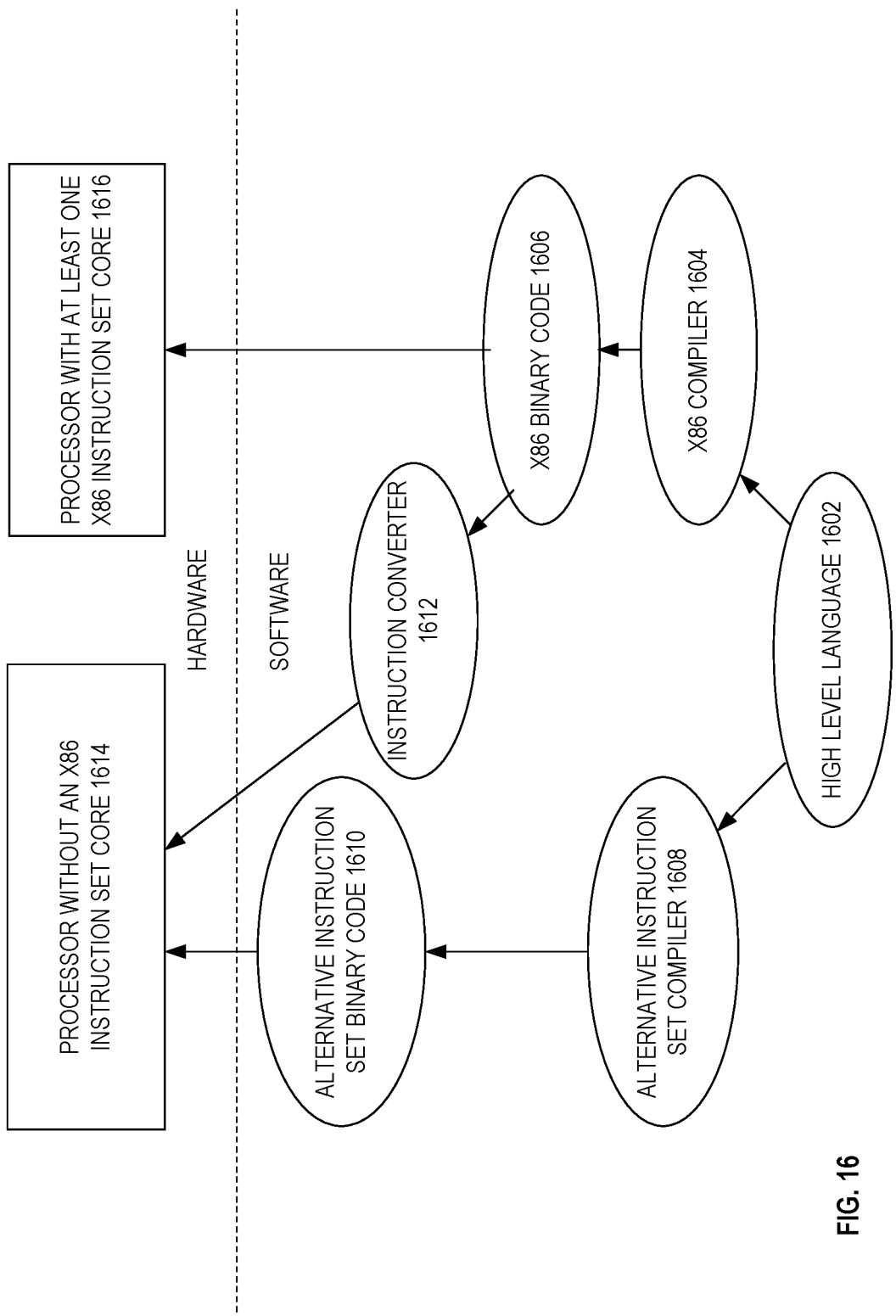
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 1, 2, and 4 may also optionally apply to any of FIGS. 3, 5, 6, 7, and 8. Moreover, components, features, and details described for any of the apparatus may also optionally apply to any of the methods, which in embodiments may be performed by and/or with such apparatus. A processor may have different logic to perform the different blocks of FIGS. 3, 5, 7, and 8. Any of the processors described herein may be included in any of the computer systems disclosed herein (e.g., FIGS. 12-15). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein. The instructions disclosed herein may have any of the features of the instruction formats described herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a user-level suspend thread instruction that is to indicate a first alternate state. The processor also includes an execution unit coupled with the decode unit. The execution unit is operative to perform the instruction at a user privilege level. The execution unit in response to the instruction, is to: (1) suspend execution of a user-level thread, from which the instruction is to have been received; (2) transition a logical processor, on which the user-level thread was to have been running, to the indicated first alternate state; and (3) resume the execution of the user-level thread, when the logical processor is in the indicated first alternate state, with a latency that is to be less than half a latency that execution of a thread can be resumed when the logical processor is in a halt processor power state.

Example 2 includes the processor of Example 1, in which the decode unit is to decode the instruction that is to have a field to select the first alternate state as any one of a plurality of different possible alternate states.

Example 3 includes the processor of Example 2, in which the plurality of different possible alternate states include a second alternate state. Also optionally in which the second alternate state is to allow execution of a user-level thread to be resumed with a latency that is to be no more than the latency when the logical processor is in the halt processor power state.

Example 4 includes the processor of any one of Examples 1 to 3, further including a storage location that is to store a supervisory system software imposed timeout value. Also optionally in which the execution unit, in response to the instruction, is to: (1) determine that the supervisory system software imposed timeout value has expired; and (2) also optionally resume the execution of the user-level thread in response to determining that the supervisory system software imposed timeout value has expired.

Example 5 includes the processor of any one of Examples 1 to 4, further including an architecturally visible storage location. The execution unit, in response to the instruction, is to store an indication that the execution of the user-level thread resumed due to the supervisory system software imposed timeout value expiring in the architecturally visible storage location.

Example 6 includes the processor of Example 5, in which the execution unit, in response to the instruction, is to store the indication by modifying an architectural flag in a register that is to store a plurality of flags.

Example 7 includes the processor of any one of Examples 1 to 6, in which the decode unit is to decode the instruction that is to indicate a user-level timeout value. Also optionally in which the execution unit, in response to the instruction, is to: (1) determine that the user-level timeout value has expired; and (2) also optionally resume the execution of the user-level thread in response to determining that the user-level timeout value has expired.

Example 8 includes the processor of any one of Examples 1 to 7, in which the execution unit, in response to the instruction, is to resume the execution of the user-level thread, when the logical processor is in the indicated first alternate state, with the latency that is to be less than one fifth the latency when the logical processor is in the halt processor power state.

Example 9 includes the processor of any one of Examples 1 to 8, in which the execution unit, in response to the instruction, is to resume the execution of the user-level thread, when the logical processor is in the indicated first alternate state, with the latency that is to be less than five hundred clock cycles.

Example 10 includes the processor of any one of Examples 1 to 9, in which the execution unit, in response to the instruction, is to resume the execution of the user-level thread without a need to exit the user privilege level.

Example 11 is a method in a processor including receiving a user-level suspend thread instruction from a user-level thread, the instruction indicating a first alternate state. The method also includes performing the instruction at a user privilege level, including: (1) suspending execution of the user-level thread; (2) transitioning a logical processor, on which the user-level thread was running, to the indicated first alternate state; (3) resuming the execution of the user-level thread, when the logical processor is in the indicated first alternate state, with a latency that is less than half a latency of resuming execution of a thread when the logical processor is in a halt processor power state.

Example 12 includes the method of Example 11, in which receiving includes receiving the instruction that has a field to select the first alternate state as any one of a plurality of different possible alternate states.

Example 13 includes the method of any one of Examples 11 to 12, in which the plurality of different possible alternate states include a second alternate state. Also optionally in which the second alternate state allows execution of a user-level thread to be resumed with a latency that is to be no more than the latency when the logical processor is in the halt processor power state.

Example 14 includes the method of any one of Examples 11 to 13, further including: (1) determining that a supervisory system software imposed timeout value has expired; and (2) optionally resuming the execution of the user-level thread in response to determining that the supervisory system software imposed timeout value has expired.

Example 15 includes the method of Example 14, further including storing an indication that the execution of the user-level thread was resumed due to the supervisory system software imposed timeout value expiring in an architecturally visible storage location of the processor.

Example 16 includes the method of Example 15, in which storing the indication includes modifying an architectural flag in a register used to store a plurality of architectural flags, and further including accessing the supervisory system software imposed timeout value from a control register of the processor.

Example 17 includes the method of any one of Examples 11 to 16, in which receiving includes receiving the instruction that indicates a user-level timeout value, also optionally the method further including: (1) determining that the user-level timeout value has expired; and (2) optionally resuming the execution of the user-level thread in response to determining that the user-level timeout value has expired.

Example 18 includes the method of any one of Examples 11 to 17, in which resuming the execution of the user-level thread, when the logical processor is in the indicated first alternate state, is with the latency that is less than one fifth the latency when the logical processor is in the halt processor power state.

Example 19 includes the method of any one of Examples 11 to 19, in which resuming the execution of the user-level thread is performed without a need to exit the user privilege level.

Example 20 is a system to process instructions including an interconnect, and processor coupled with the interconnect. The processor is to receive a user-level suspend thread instruction. The instruction to indicate to indicate a first alternate state. The processor is operative to perform the instruction at a user privilege level, and in response to the instruction, to: (1) suspend execution of a user-level thread corresponding to the; (2) transition one of a single threaded core, a hardware thread, a thread unit, a thread slot, and a logical processor having dedicated context and a dedicated program counter, which the user-level thread was to have been running on, to the indicated first alternate state; and (3) resume the execution of the user-level thread, when said one is in the indicated first alternate state, with a latency that is to be less than half a latency that execution of a thread can be resumed when said one is in a halt processor power state. The system also optionally includes a dynamic random access memory (DRAM) coupled with the interconnect.

Example 21 includes the system of Example 20, in which the instruction is to have a field to select the first alternate state as any one of a plurality of different possible alternate states.

Example 22 is an article of manufacture including a non-transitory machine-readable storage medium. The non-transitory machine-readable storage medium storing a user-level suspend thread instruction. The instruction is operative to indicate a first alternate state. The instruction is operative to be executed at a user privilege level. The instruction if performed by a machine is to cause the machine to perform operations including: (1) suspend execution of a user-level thread that corresponds to the instruction; (2) transition one of a single threaded core, a hardware thread, a thread unit, a thread slot, and a logical processor having dedicated context and a dedicated program counter, on which the user-level thread is to have been running, to the indicated first alternate state; and (3) resume the execution of the user-level thread, from the logical processor being in the indicated first alternate state, with a latency that is less than half a latency of resuming execution of a thread when the logical processor is in a halt processor power state.

Example 23 includes the article of manufacture of Example 22, in which the instruction has a field to select the first alternate state as any one of a plurality of different possible alternate states.

Example 24 includes the article of manufacture of any one of Examples 22 to 23, in which the instruction if performed by the machine is further to cause the machine to perform operations including: (1) determine that a supervisory system software imposed timeout value has expired; and (2) optionally resume the execution of the user-level thread in response to a determination that the supervisory system software imposed timeout value has expired.

Example 25 includes the article of manufacture of any one of Examples 22 to 24, in which the instruction if performed by the machine is further to cause the machine to perform operations including: (1) determine that the user-level timeout value has expired; and (2) optionally resume the execution of the user-level thread in response to determining that the user-level timeout value has expired.

Example 26 includes the processor of any one of Examples 1 to 10, further including an optional branch prediction unit to predict branches, and an optional instruction prefetch unit, coupled with the branch prediction unit, the instruction prefetch unit to prefetch instructions including the user-level suspend thread instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the user-level suspend thread instruction, in some cases from one of the L1 instruction cache and the L2 cache, and to provide the user-level suspend thread instruction to the decode unit. The processor may also optionally include a register rename unit to rename registers, an optional scheduler to schedule one or more operations that have been decoded from the user-level suspend thread instruction for execution, and an optional commit unit to commit execution results of the user-level suspend thread instruction.

Example 27 includes a system-on-chip that includes at least one interconnect, the processor of any one of Examples 1 to 10 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 11 to 19.

Example 29 is a processor or other apparatus that includes means for performing the method of any one of Examples 11 to 19.

Example 30 is a processor or other apparatus that includes any combination of modules and/or units and/or logic and/or circuitry and/or means operative to perform the method of any one of Examples 11 to 19.

Example 31 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 11 to 19.

Example 32 is a processor or other apparatus substantially as described herein.

Example 33 is a processor or other apparatus that is operative to perform any method substantially as described herein.

Example 34 is a processor or other apparatus that is operative to perform any user-level suspend thread instruction substantially as described herein.

Example 35 is a computer system or other electronic device that includes a processor having a decode unit operative to decode instructions of a first instruction set. The processor also has one or more execution units. The electronic device also includes a storage device coupled with the processor. The storage device is operative to store a first instruction, which may be any of the instructions substantially as disclosed herein, and which is to be of a second different instruction set. The storage device is also operative to store instructions to convert the first instruction into one or more instructions of the first instruction set. The one or more instructions of the first instruction set, when performed by the processor, are operative to cause the processor to have a same effect as the first instruction if performed directly.

What is claimed is:

1. A processor comprising:
   a control register to store a first timeout value corresponding to a supervisory system software privilege level;
   a decode unit to decode a user-level suspend thread instruction of a user-level thread, the user-level suspend thread instruction to indicate a first alternate state, and the user-level suspend thread instruction to indicate a second timeout value corresponding to a user-level privilege; and
   an execution unit coupled with the decode unit, the execution unit to perform operations corresponding to the user-level suspend thread instruction at a user-level privilege, without aborting a transactional memory transaction when the user-level suspend thread instruction is included within the transactional memory transaction, the operations including to:
   suspend execution of the user-level thread;
   transition a logical processor corresponding to the user-level thread to the indicated first alternate state;
   determine whether either the first timeout value or the second timeout value has expired; and
   resume performance of the user-level thread from the first alternate state, in response to a thread resume condition, with a latency of less than five hundred clock cycles, wherein the first and second timeout values are to timeout the suspension of the execution of the user-level thread.

2. The processor of claim 1, wherein the latency is less than two hundred clock cycles.

3. The processor of claim 1, wherein the user-level suspend thread instruction is to indicate the first alternate state as one of a plurality of possible alternate states.

4. The processor of claim 3, wherein the plurality of possible alternate states includes a second alternate state from which performance of the user-level thread is to be resumed with a latency that is less than the latency of the first alternate state.

5. The processor of claim 4, wherein the latencies for both the first alternate state and the second alternate state are less than a latency of a halt state.

6. The processor of claim 1, wherein the execution unit, when the first timeout value has expired, is to store an indication that the first timeout value has expired.

7. A method in a processor comprising:
  accessing a first timeout value corresponding to a privilege level of supervisory system software from a control register of the processor;
  receiving a user-level suspend thread instruction from within a transactional memory transaction of a user-level thread, the user-level suspend thread instruction indicating a first alternate state, and the user-level suspend thread instruction specifying a second timeout value corresponding to a privilege level of the user-level thread; and
  performing operations corresponding to the user-level suspend thread instruction at a user-level privilege, without aborting the transactional memory transaction, the operations including:
    suspending execution of the user-level thread;
    transitioning a logical processor corresponding to the user-level thread to the indicated first alternate state;
    determining whether either the first timeout value or the second timeout value has expired;
    detecting a thread resume condition; and
    resuming performance of the user-level thread from the first alternate state, after detecting the thread resume condition, with a latency of less than five hundred clock cycles, wherein the first and second timeout values are timeout values for the suspension of the execution of the user-level thread.

8. The method of claim 7, wherein the user-level thread is resumed with the latency that is less than two hundred clock cycles.

9. The method of claim 7, wherein the user-level suspend thread instruction indicates the first alternate state as one of a plurality of possible alternate states.

10. The method of claim 9, wherein the plurality of possible alternate states includes a second alternate state from which performance of the user-level thread is resumable with a latency that is less than the latency of the first alternate state.

11. The method of claim 7, further comprising:
  determine that the first timeout value has expired as the thread resume condition; and
  storing an indication that the first timeout value has expired.

12. A system comprising:
  an interconnect;
  a dynamic random access memory (DRAM) coupled with the Interconnect; and
  a processor coupled with the interconnect, the processor including:
    a control register to store a first timeout value corresponding to a privilege level of supervisory system software;
    a decode unit to decode a user-level suspend thread instruction of a user-level thread, the user-level suspend thread instruction to indicate a first alternate state, and the user-level suspend thread instruction to indicate a second timeout value; and
    an execution unit coupled with the decode unit, the execution unit to perform operations corresponding to the user-level suspend thread instruction at a user-level privilege, without aborting a transactional memory transaction when the user-level suspend thread instruction is included within the transactional memory transaction, the operations including to:
      suspend execution of the user-level thread;
      transition a logical processor corresponding to the user-level thread to the indicated first alternate state;
      determine whether either the first timeout value or the second timeout value has expired; and
      resume performance of the user-level thread from the first alternate state, in response to a thread resume condition, with a latency of less than five hundred clock cycles, wherein the first and second timeout values are to be used to timeout the suspension of the execution of the user-level thread.

13. The system of claim 12, wherein the execution unit, when the first timeout value has expired, is to store an indication that the first timeout value has expired.

14. The processor of claim 1, wherein the execution unit, when the first timeout value has expired, is to set a carry flag in a flags register of the processor having a plurality of architectural flags to indicate that the first timeout value has expired.

15. The processor of claim 4, wherein the user-level suspend thread instruction is to specify a register that is to store a value that is to indicate the first alternate state.

16. The method of claim 7, further comprising setting a carry flag in a flags register of the processor having a plurality of architectural flags to indicate that the first timeout value has expired.

17. The method of claim 10, wherein the user-level suspend thread instruction specifies a register that stores a value that indicates the first alternate state.

18. The system of claim 12, wherein the execution unit, when the first timeout value has expired, is to set a carry flag in a flags register of the processor, and wherein the user-level suspend thread instruction is to specify a register that is to store a value that is to indicate the first alternate state.

* * * * *